(12) United States Patent
Okada et al.

(10) Patent No.: US 7,305,170 B2
(45) Date of Patent: Dec. 4, 2007

(54) INFORMATION RECORDING MEDIUM, APPARATUS AND METHOD FOR RECORDING OR REPRODUCING DATA THEREOF

(75) Inventors: Tomoyuki Okada, Osaka (JP); Kaoru Murase, Nara (JP); Kazuhiro Tsuga, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1180 days.

(21) Appl. No.: 09/836,292

(22) Filed: Apr. 18, 2001

(65) Prior Publication Data

US 2002/0018643 A1 Feb. 14, 2002

Related U.S. Application Data

(63) Continuation-in-part of application No. 09/443,498, filed on Nov. 19, 1999.

(30) Foreign Application Priority Data

Nov. 19, 1998 (JP) ................. 10-329032

(51) Int. Cl.
*H04N 5/91* (2006.01)
(52) U.S. Cl. ............... 386/68; 386/95; 386/70; 386/125
(58) Field of Classification Search ............ 386/95, 386/109, 125–126, 70, 68
See application file for complete search history.

(56) References Cited

U.S. PATENT DOCUMENTS

| 5,535,008 A * | 7/1996 | Yamagishi et al. ......... 386/109 |
|---|---|---|
| 5,568,461 A | 10/1996 | Nishiuchi et al. |
| 5,596,564 A | 1/1997 | Fukushima et al. |
| 5,694,172 A | 12/1997 | Miyano |
| 5,737,479 A * | 4/1998 | Fujinami .................... 386/95 |
| 5,740,306 A | 4/1998 | Shinohara et al. |
| 5,748,240 A | 5/1998 | Carr et al. |
| 5,838,873 A | 11/1998 | Blatter et al. |
| 5,838,876 A | 11/1998 | Iwamura |
| 5,854,873 A | 12/1998 | Mori et al. |

(Continued)

FOREIGN PATENT DOCUMENTS

EP 0505985 9/1992

(Continued)

OTHER PUBLICATIONS

U.S. Appl. No. 09/414,958, filed Oct. 12, 1999, entitled "Information Recording Medium, Apparatus and Method for Recording or Reproducing Data Thereof," by Tomoyuki Okada et al.

*Primary Examiner*—Vincent F. Boccio
(74) *Attorney, Agent, or Firm*—Wenderoth, Lind & Ponack, L.L.P.

(57) ABSTRACT

An information recording medium stores information transmitted as a transport stream as objects. The management information written to the information recording medium includes object information for managing the recorded objects. The object information includes an access map. The access map manages the MPEG transport stream in block units, each block containing an integer multiple number of ECC blocks. In addition to the specific information for accessing the blocks, the access map also includes an I-picture Included Flag indicating whether each block includes I-picture data. It is therefore possible to randomly access the transport stream, which otherwise lacks random accessibility to the middle of the stream.

3 Claims, 31 Drawing Sheets

U.S. PATENT DOCUMENTS

| | | | |
|---|---|---|---|
| 5,870,523 A * | 2/1999 | Kikuchi et al. | 386/95 |
| 5,881,203 A * | 3/1999 | Fujinami et al. | 386/96 |
| 6,009,237 A | 12/1999 | Hirabayashi et al. | |
| 6,075,920 A * | 6/2000 | Kawamura et al. | 386/95 |
| 6,169,843 B1 * | 1/2001 | Lenihan et al. | 386/46 |
| 6,298,033 B1 * | 10/2001 | Tanoue et al. | 369/275.3 |
| 6,308,003 B1 * | 10/2001 | Hirabayashi et al. | 386/70 |
| 6,445,877 B1 * | 9/2002 | Okada et al. | 386/95 |
| 6,477,313 B1 * | 11/2002 | Itoi | 386/52 |

FOREIGN PATENT DOCUMENTS

| | | |
|---|---|---|
| EP | 0794667 | 9/1997 |
| EP | 0827336 A2 | 3/1998 |
| EP | 0866461 | 9/1998 |
| GB | 2308264 | 6/1997 |
| JP | 7-93873 | 4/1995 |
| JP | 8-7282 | 1/1996 |

* cited by examiner

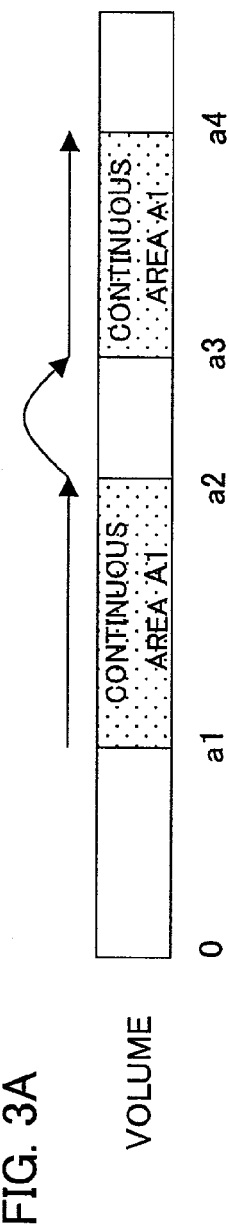
FIG. 3A
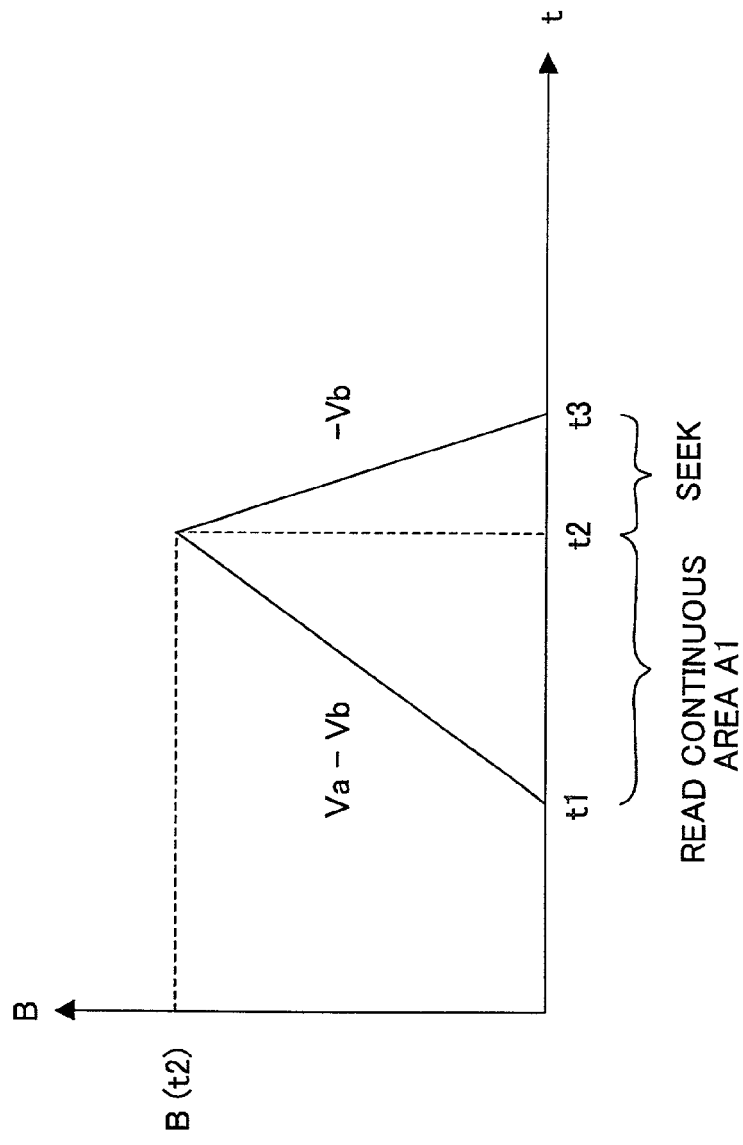
FIG. 3B DATA AMOUNT STORED IN TRACK BUFFER

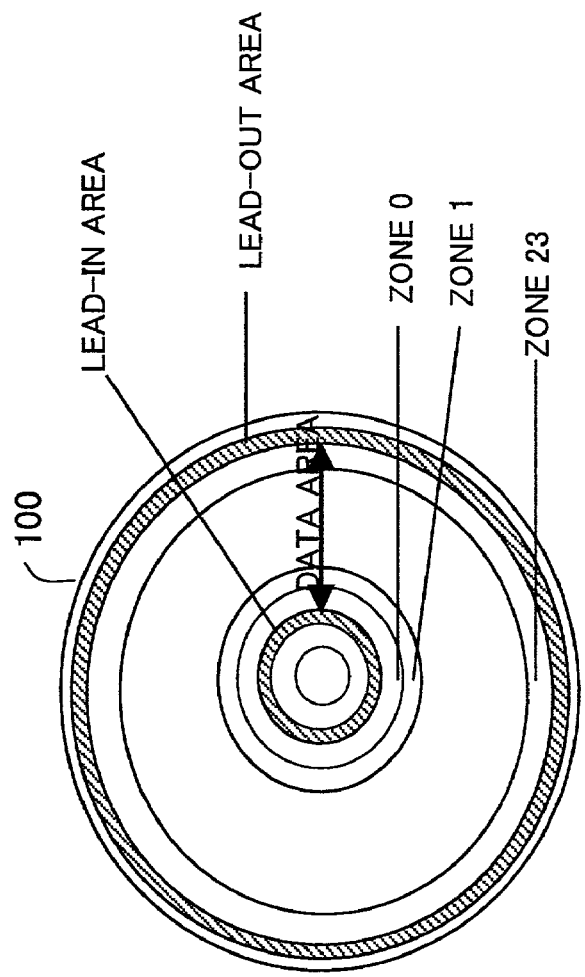
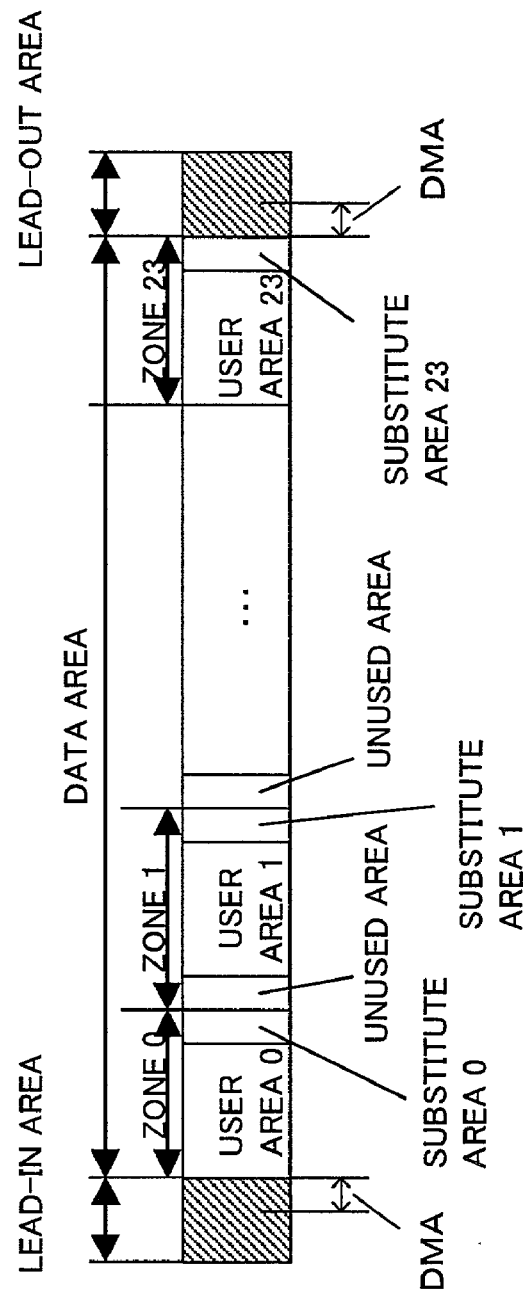
FIG. 4A
FIG. 4B

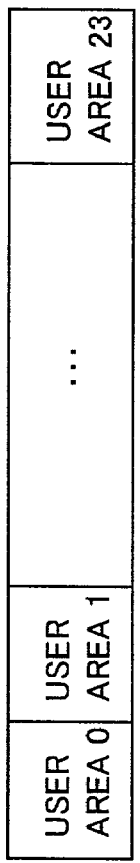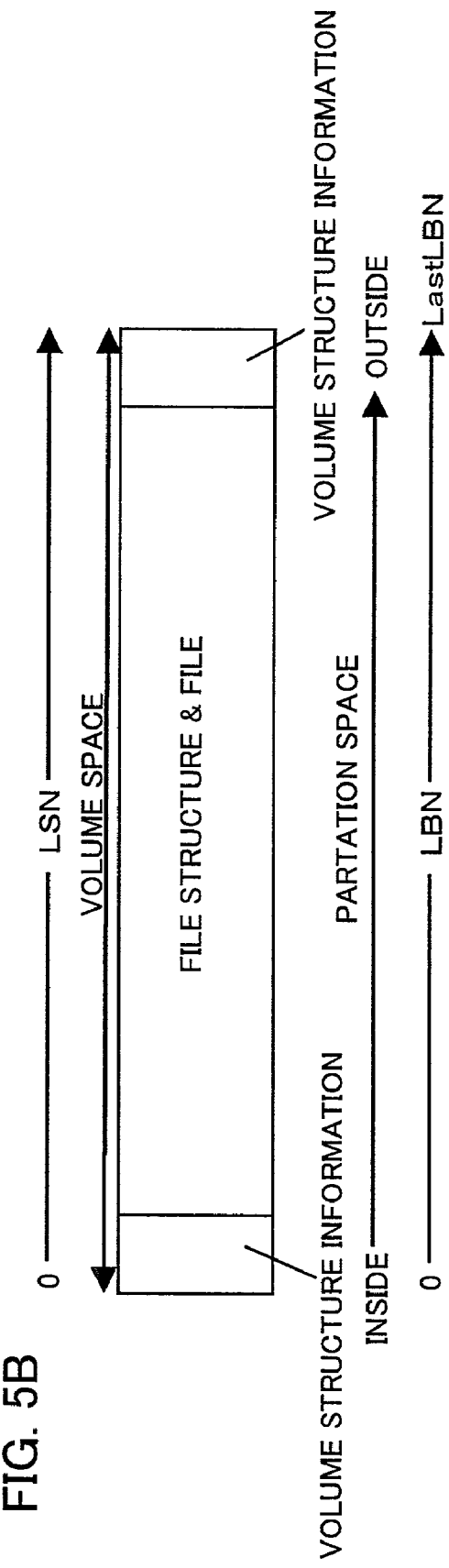
FIG. 5A
FIG. 5B

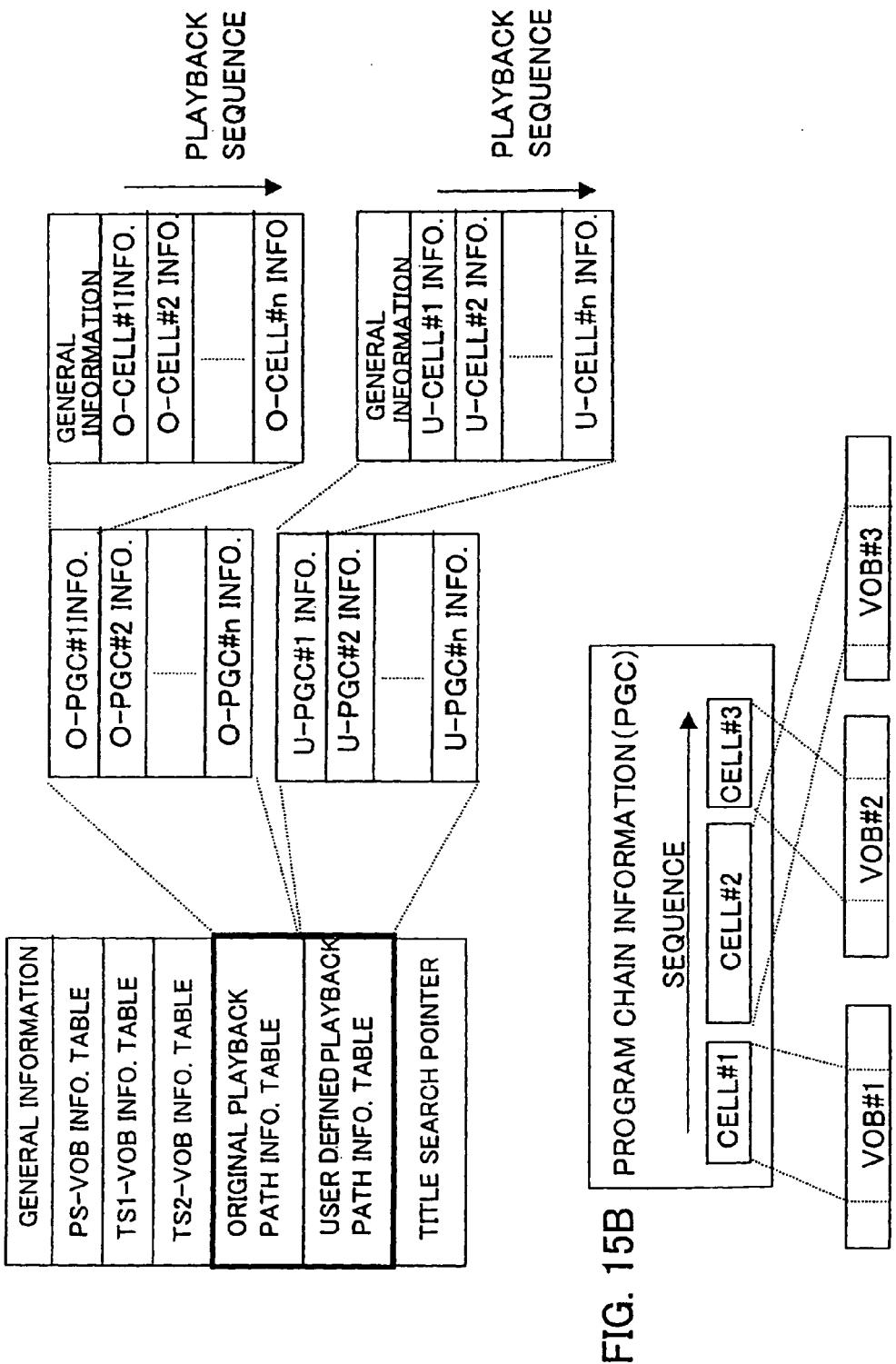

FIG. 17

| | STREAM | SELF-ENCODING | TO SPECIFY I-PICTURE (ACCESS UNIT) |
|---|---|---|---|
| CASE 1) | PS (PROGRAM) | ○ | ○ |
| CASE 2) | TS (TRANSPORT) | ○ | ○ |
| CASE 3) | TS (TRANSPORT) | × | ○ |
| CASE 4) | TS (TRANSPORT) | × | × |

FIG. 18

| | TIME INFORMATION | PRECISION OF SPECIFYING POSITION |
|---|---|---|
| ACCESS MAP #1 | OBJECT PRESENTATION TIME (PTS) | SPECIFY ACCESS UNIT WITH BYTE LEVEL |
| ACCESS MAP #2 | OBJECT PRESENTATION TIME (PTS) | SPECIFY ACCESS UNIT WITH BLOCK UNIT |
| ACCESS MAP #3 | PACKET ARRIVAL TIME (ATS) | SPECIFY ACCESS UNIT WITH BLOCK UNIT |
| ACCESS MAP #4 | PACKET ARRIVAL TIME (ATS) | ACCESS UNIT IS NOT SPEIFIED |

INFORMATION RECORDING MEDIUM, APPARATUS AND METHOD FOR RECORDING OR REPRODUCING DATA THEREOF

The present invention is a continuation in part application of application Ser. No. 09/443,498 by Okada et al., filed on Nov. 19, 1999 in the United States, the content of which is incorporated herein by reference.

BACKGROUND OF THE INVENTION (1. Field of the Invention)

The present invention relates generally to a readable/writable information recording medium. More specifically, the invention relates to an information recording medium for recording multimedia data containing information in different kinds of formats, including moving picture data, still picture data, and audio data; and to an apparatus and method for recording data to and replaying data from the information recording medium.

(2. Description of Related Art)

While the maximum storage capacity of rewritable optical disc media was recently 650 MB, phase-change type DVD-RAM media that are now available can store several gigabytes. DVD-RAM media are already used in the computer industry, and commercialization of the MPEG and MPEG-2 digital AV data coding standards are expected to bring new uses for DVD-RAM media in the audio-video industry.

A major area of interest is how to best use such large capacity optical discs to record image data and other AV data in ways that achieve significantly greater performance than conventional AV equipment and also offer new functionality. Furthermore, because AV equipment is not a personal computer, there are significant limitations in terms of how much memory can be provided. It is also necessary to provide an interface that is easy to use for users who are not computer literate, and that makes it possible to provide functions that are easy to understand and manipulate.

Current DVD recorders record MPEG content using a program stream format. Digital broadcasting, however, uses a transport stream format, and it is therefore preferable to directly record content using the same transport stream format. The transport stream is intended for broadcasting and communications applications, and thus does not provide for randomly accessing the transport stream. In addition, transport stream data is already digital, and can therefore be recorded without an encoding process through the DVD recorder, as is needed to record a program stream. A problem with storing a transport stream of this type to an optical disc or other medium is that random access, one of the greatest features of disc media, cannot be sufficiently achieved.

Moreover, data input using a transport stream may include data conforming to different standards and even non-standard data types. In such cases, the DVD recorder may not be able to determine the location of an intra-coded picture, or the identified address may have been recorded containing errors. A problem in this case is that when such data is replayed, data at the location of the intra-coded picture may contain errors, and normal playback may not be possible.

SUMMARY OF THE INVENTION

The present invention is directed to solving the aforementioned problems and an object of this invention is to provide an information recording medium for recording an MPEG transport stream which is lacking in the ability to access the stream at a random point, in conjunction with other AV streams so as to improve random accessibility. A further object of this invention is to provide an apparatus and method for recording information to and replaying or reproducing information from the information recording medium of the invention.

In a first aspect of the invention, an information recording medium is provided which stores at least one object containing multiplexed encoded video data and encoded audio data, and management information for managing the one or more objects. The image data includes intra-coded picture data and inter-coded picture data. The management information includes map information for the at least one object, the map information managing the objects in blocks of a fixed length and correlating the presentation time of the video data multiplexed to the objects to the blocks, and the map information indicating which of the blocks constituting the object includes the leading data of the intra-coded picture data.

In a second aspect of the invention, an information recording medium is provided which stores at least two objects containing multiplexed encoded video data and encoded audio data, and management information for managing the at least two objects. The video data includes intra-coded picture data and inter-coded picture data. The at least two objects include at least a first object and a second object. The first object is an object for which the location of intra-coded picture data in the object is managed by the management information. The second object is an object for which the location of intra-coded picture data in the object is not managed by the management information. The management information is information for separately managing the first object and the second object, and includes map information for each first object, and the map information correlates a playback time of the corresponding first object with the location of intra-coded picture data included in the object.

In a third aspect of this invention, a recording apparatus is provided for recording information to the information recording medium described above. The information recording apparatus comprises an interface for inputting the object from an external part, a generating section for generating management information corresponding to the input object, and a recording section for recording the object and the management information to the information recording medium. The generating section includes a detection section for determining if a block contained in the input object includes intra-coded picture data, and a producing section for producing the management information containing map information based on the result from the detection section.

In a fourth aspect of this invention, a reproducing apparatus is provided for reproducing data from the information recording medium described above. The apparatus comprises a playback section for reading and reproducing the object and management information from the information recording medium, a user interface for receiving an instruction specifying the object to play back, and an instruction specifying a playback time for starting playback of the object, and a controller for controlling the playback section. When the specified object is a first object, the controller controls the playback section so as to identify picture data which is included in the specified object and corresponds to the specified playback time based on the map information of the management information, and begin the playback from the identified picture data.

(Advanteges of the Invention)

The information recording medium of the invention enables the transport stream received from digital broadcast media to be recorded with other AV streams while also enabling the recorded digital broadcast object to be reproduced with random access to object content. Information for identifying the validity of the flag indicating the inclusion of intra-coded pictures (I-pictures) is also provided in the management information used to manage the stream. This enables even recorders that are unable to analyze the stream but can record the transport stream to record the transport stream in a way that enables the recorded information to be played back with no problems.

The recording apparatus and method of this invention can thus record a transport stream received via digital broadcast to an information recording medium in a manner enabling the recorded transport stream to be randomly accessed during playback.

The reproducing apparatus and method of this invention can also randomly access a transport stream received via digital broadcast media and recorded to the information recording medium with other AV streams.

BRIEF DESCRIPTION OF THE DRAWINGS

FIG. 3A shows the address space on a disc, and

FIG. 3B shows the accumulation of data in the track buffer;

FIG. 4A and FIG. 4B describe the lead-in area, data area, and lead-out area of the disc;

FIG. 5A and FIG. 5B describe the volume space on the disc;

FIG. 12A to FIG. 12C2 shows a PAT table and PMAP table used for transmitting the structure data of the audio stream and video stream composing a program;

FIG. 15A describes the data structure of the video management information (video manager), focusing on the program chain information (PGC);

FIG. 15B shows the data structure of the program chain information;

FIG. 17 is a table showing the classification of the access map for different input stream cases;

FIG. 18 is a table showing access map types;

DESCRIPTION OF THE PREFERRED EMBODIMENTS

The preferred embodiments of the present invention are described below with reference to the accompanying drawings.

First Embodiment (1. DVD Recorder System Concept)

Figure 1:
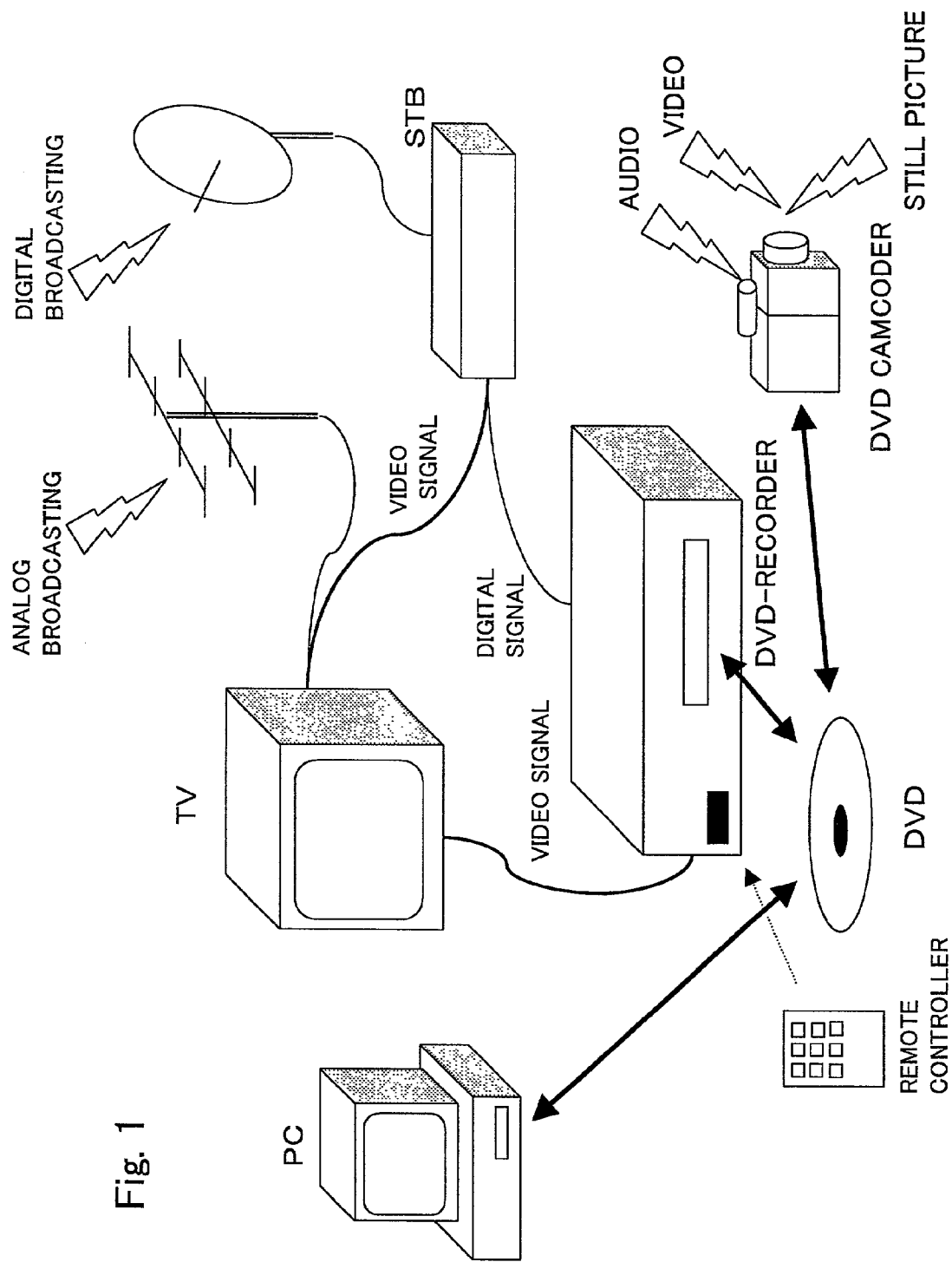
FIG. 1 shows the relationship between media and AV devices which are targeted by a DVD recorder according to the present invention.

FIG. 1 shows an exemplary interface between a DVD recorder and peripheral equipment used with the DVD recorder.

As shown in FIG. 1, a DVD disc which is just one type of optical disc is loaded into the DVD recorder for recording/reproducing video data to/from the disc. The operation of the DVD recorder is generally done using a remote control unit.

Video data can be input to a DVD recorder as an analog or digital signal. Analog broadcasts use analog signals, and digital broadcasts use digital signals. Analog broadcasts are generally received and demodulated by a receiver, such as one built in to a television, and then input to the DVD recorder as an analog video signal in the NTSC format, for example. Digital broadcasts are demodulated into a digital signal by a STB (Set Top Box) which serves as a receiver, and then input to the DVD recorder for recording.

On the other hand, video data recorded to a DVD disc is played back by the DVD recorder and then output to an external device. DVD recorder output can also be an analog signal or digital signal. If the DVD recorder outputs an analog signal, the signal can be input directly to a television. If the output is a digital signal, the signal first passes through the STB for conversion to an analog signal, and is then output to the television for display.

Video can also be recorded to and replayed from DVD discs by devices other than DVD recorders, including DVD camcorders and personal computers. Even when a DVD disc containing video data recorded by a device other than a DVD recorder is loaded into a DVD recorder, the DVD recorder can also play back the DVD disc.

Audio information typically accompanies the video information contained in analog and digital broadcasts, in which case the audio information is also recorded and replayed by the DVD recorder. The video information is generally moving picture images (such as a movie), but may also include still pictures. Still images can be recorded using the snapshot function of a DVD camcorder, for example.

Digital interfaces between the STB and DVD recorder include IEEE 1394, ATAPI, and SCSI interfaces.

It will also be noted that an NTSC composite video signal is referred to above by way of example as the signal passed from the DVD recorder to the television, but a component signal carrying separate luminance and color difference signals can be used.

It should also be noted that while an analog interface is commonly used for video transmission between the AV device and television, replacing this analog interface with a digital interface such as DVI is also being researched. Connecting the DVD recorder and television by way of a digital interface is naturally expected to follow.

(2. DVD Recorder Functions)

Figure 2:
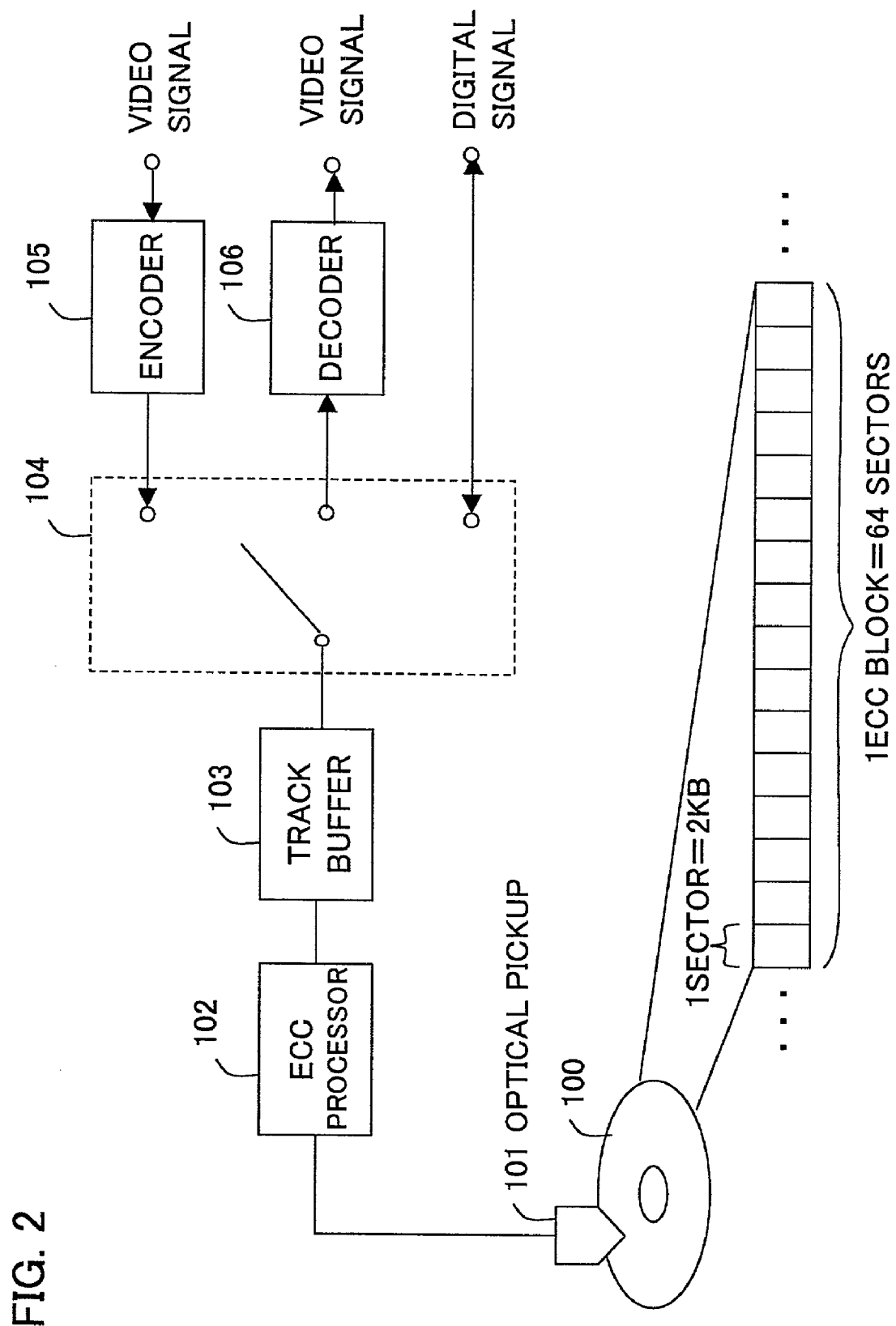
FIG. 2 is a block diagram of the drive device in the DVD recorder shown in FIG. 1.

FIG. 2 is a block diagram showing the functions of a DVD recorder. The DVD recorder has an optical pickup 101 for reading data from DVD-RAM disc 100, an error correcting code (ECC) processor 102, a track buffer 103, a selector switch 104 for changing input to and output from the track buffer 103, an encoder 105, and a decoder 106.

As shown in FIG. 2, the smallest unit for recording information to DVD-RAM disc 100 is 2 KB per sector. The ECC processor 102 applies error correction processing in ECC blocks each containing 64 sectors.

It will also be obvious that one sector could be defined as 512 bytes or 8 KB. Each ECC block could contain 1 sector, 16 sectors, or 32 sectors. The sector size and number of sectors per ECC block typically increase in conjunction with the increase in the amount of information that can be recorded.

The track buffer 103 is used for variable bit rate (VBR) recording of the AV data as a means of more efficiently recording AV data to the DVD-RAM disc 100. More specifically, since the DVD-RAM disc 100 read/write rate (Va) is fixed and the bit rate (Vb) of the AV data content (images, in the case of video) changes according to the complexity of the AV data, track buffer 103 is used to absorb these differences in the bit rate.

The track buffer 103 can also be used even more effectively so that AV data can be recorded noncontiguously to the DVD-RAM disc 100. This is further described below with reference to FIG. 3A and FIG. 3B.

FIG. 3A shows the address space on the disc. Let us assume that AV data is recorded to continuous area [a1, a2] and to continuous area [a3, a4] as shown in FIG. 3A. Continuous playback of the AV data can be maintained in such cases by supplying data stored in the track buffer to the decoder 106 while seeking from a2 to a3. This is illustrated in FIG. 3B.

When reading the AV data starts from address a1, the data is input to track buffer 103 from time t1, and data output from track buffer 103 also starts. This means that data accumulates in the track buffer at rate difference (Va−Vb), which is the difference between the track buffer input rate (Va) and the track buffer output rate (Vb). This continues until the data is read to address a2, that is, time t2. When the amount of data accumulated in the track buffer 103 during this time is taken as B(t2), continuous playback can be sustained by supplying data B(t2) accumulated in the track buffer 103 to decoder 106 between time t2 and time t3 at which reading data starts from address a3.

In other words, even when a seek occurs, continuous AV data playback is possible if the amount of data ([a1, a2]) read before the seek starts is more than or equal to a specified amount.

The size of the continuous area enabling continuous AV data output can be determined from the following equation by converting to the ECC block count (N_ecc).

$$N\_ecc = Vb*Tj/((N\_sec*8*S\_size)*(1-Vb/Va))$$

where N_sec is the number of sectors per ECC block, S_size is the sector size, and Tj is the seek performance (maximum seek time).

There are also cases in which there is a defective sector in the continuous area. In such cases the continuous area size can be obtained from the following equation obtaining the ECC block count as above.

$$N\_ecc = dN\_ecc + Vb*Tj/((N\_sec*8*S\_size)*(1-Vb/Va))$$

where dN_ecc is the allowed defective sector size.

It should be noted that reading, that is, replaying or reproducing data from a DVD-RAM disc is considered in the above example, writing, that is, recording data to DVD-RAM can be handled in the same way.

As described above, it is therefore possible to sustain the continuous playback and recording with a DVD-RAM disc even when the AV data is noncontiguously recorded to the disc insofar as the AV data is recorded in continuous blocks of a specific minimum size. This continuous area is called CDA in DVD terminology.

(3. DVD Discs)

A DVD-RAM disc, a type of recordable optical disc, is used by way of example as the readable/writable information recording medium according to this preferred embodiment of the invention.

FIG. 4A and FIG. 4B show the appearance and physical structure of a DVD-RAM disc 100, a type of recordable optical disc, used as the readable/writable information recording medium in this preferred embodiment of the invention. It should be noted that a DVD-RAM disc is typically housed in a cartridge and then loaded into the DVD recorder. This is to protect the recording surface of the disc. It will also be obvious that if the recording surface is protected by some other means, or if it is acceptable to not use the disc in a cartridge, the disc can be loaded directed into the DVD recorder.

Data is recorded to a DVD-RAM disc using a phase change method. Data recorded to the disc is managed in sector units, and is recorded with address information enabling data access. A unit of 64 sectors is used as a unit for error correction, has an error correction code added thereto, and is referred to as an ECC block.

FIG. 4A shows the recording area of this recordable DVD-RAM disc 100. DVD-RAM disc 100 has a lead-in area at the inside circumference area, a lead-out area at the outside circumference, and a data area between the lead-in area and lead-out area. A reference signal, needed to stabilize the servo for access by the optical pick-up, and an identification signal for distinguishing a DVD-RAM disc from other types of optical media, are recorded in the lead-in area. The same reference signal is also recorded to the lead-out area. The data area is divided into sectors, which is the smallest access unit; each sector stores 2K of data in this embodiment. DVD-RAM disc 100 is further divided into plural zones to enable Z-CLV (Zone Constant Linear Velocity) control of disc rotation during recording and playback.

FIG. 4A also shows several of these concentric zones on DVD-RAM disc 100. DVD-RAM disc 100 in this examples has twenty four zones numbered zone 0 to zone 23. The angular velocity of the DVD-RAM disc is controlled in each zone such that it increases the closer the zone is to the inside circumference, and remains constant while the optical pickup is accessing any same zone. This technique increases the recording density of the DVD-RAM disc, and makes rotational control during recording and playback easier.

FIG. 4B shows the lead-in area, lead-out area, and data area zones 0 to 23 shown concentrically in FIG. 4A in section view.

Each of the lead-in area and lead-out area has a defect management area (DMA). The defect management area is an area for recording address information for defective sectors, and substitution address information indicating where the sector substituted for the defective sector is located in the substitution area.

Each zone area contains a user area, and a substitution area and unused area in the zone boundary. The user area is an area used by the file system for recording information. The substitution area is an area that is substituted for a defective sector when a defective sector is found. The unused area is an area that is not used for recording information, and is provided for about two tracks. The reason why the unused area is provided is as follows. The sector address is recorded to the same location in adjacent tracks in a particular zone, but in the Z-CLV control method, the sector address recording position is different in adjacent tracks at the zone boundary, and this may result in misinterpretation of the sector address. The unused area is provided to prevent this.

As described above, there are sectors at the zone boundaries that are not used for recording information. So that only those sectors that are used for recording information are shown consecutively, DVD-RAM discs assign a logical sector number (LSN) sequentially from the inside circumference to each physical sector in the user area.

FIG. 5A and FIG. 5B show the logical data space of a DVD-RAM disc thus comprising logical sectors. The logical data space is called the volume space, and is used for recording user data.

Data recorded in the volume space is managed by the file system. More specifically, volume structure information for managing one group of sectors storing data as a file, and one group of files as a directory, is recorded at the beginning and at the end of the volume space. A UDF (Universal Disc Format) file system conforming to ISO 13346 is used as the file system in this preferred embodiment of the invention.

It will be noted that the group of sectors is not necessarily contiguously located on the disc, and can be distributed to different parts of the disc. The file system therefore manages as an extent a group of sectors that are contiguous in the volume space in the sector group constituting a file, and manages the file as a group of related extents.

Figure 6:
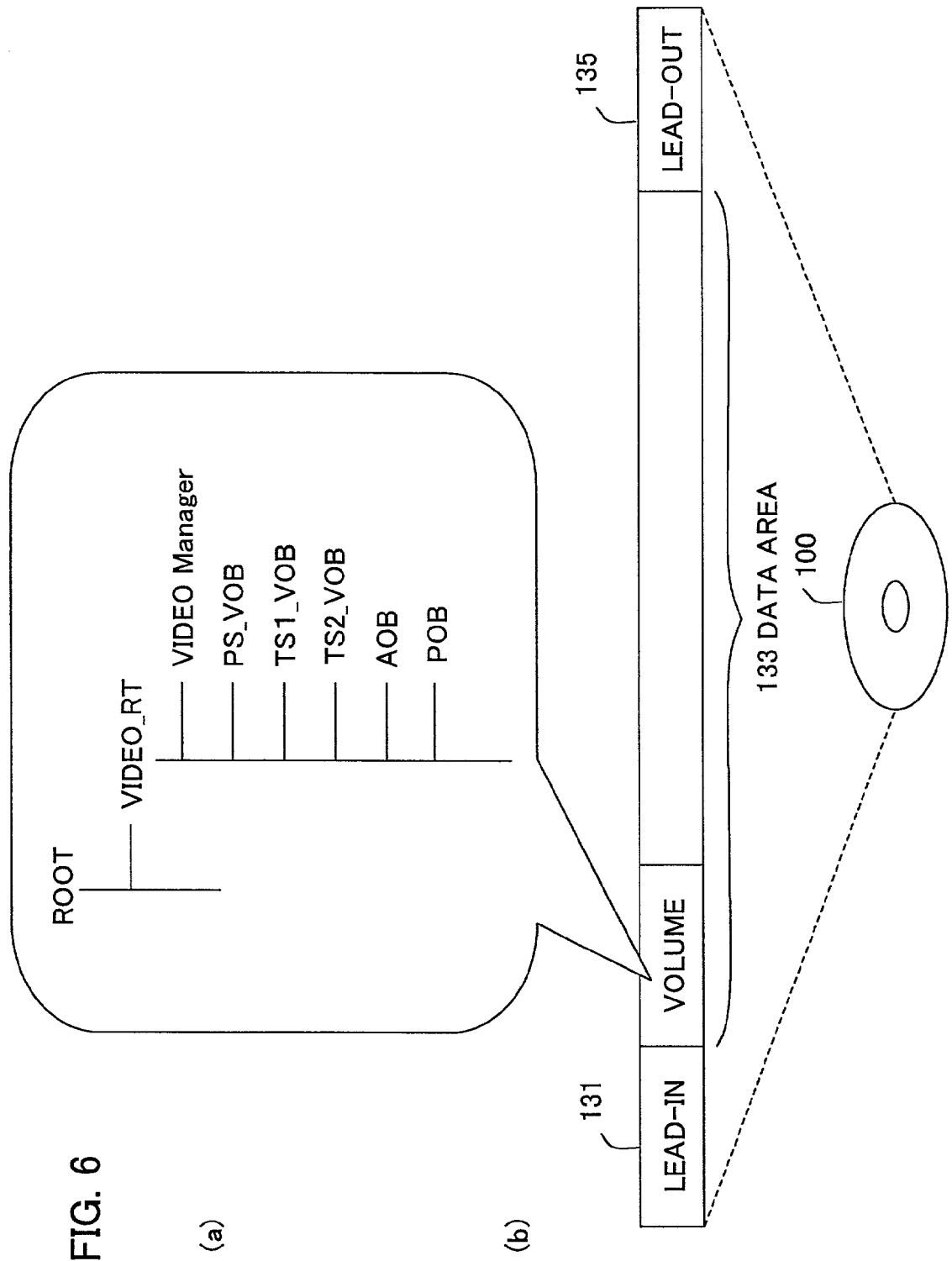
FIG. 6 show the file system and file structure.

FIG. 6 shows the structure of a directory and file recorded to a DVD-RAM disc. The VIDEO_RT directory is located at the root level. Various object files, that is, the data objects to be reproduced, and a Video Manager file which is a management information indicating the sequence in which the object files are played back and various attributes, are recorded under the VIDEO_RT directory.

The objects are data conforming to MPEG-standard, and include PS_VOB, TS1_VOB, TS2_VOB, AOB, and POB. PS_VOB, AOB and POB are the MPEG program stream (PS), while TS1_VOB and TS2_VOB are the transport stream (TS). The program stream has a data structure which is designed for storing the AV data to a package medium. The transport stream has the data structure which is designed for communications media.

Each of PS_VOB, TS1_VOB and TS2_VOB contains both video and audio data, and the video data are primary. TS1-VOB object is an object which is in principle encoded by the DVD recorder, and of which internal picture structure can be managed clearly. TS2-VOB object is an object encoded by a device other than the DVD recorder, and a part of internal picture structure of TS2-VOB object may be unclear.

Typically, TS1-VOB object is an object obtained by encoding the analog video signal input from an external source to the transport stream by the DVD recorder. TS2-VOB object is an object obtained by recording directly the digital video signal input from an external source to the disc without encoding by the DVD recorder.

AOB and POB objects are part of the MPEG program stream. AOB object is an object comprising primarily audio data, and POB object is an object comprising primarily still picture data.

It is noted that "primarily video data" and "primarily audio data" objects as used above means that the bit rate allocation for video and audio data is great respectively. VOB objects are used for applications such as movies, and AOB objects are used for audio (music) applications.

(4. Outline of Replayed AV Data)

Figure 7:
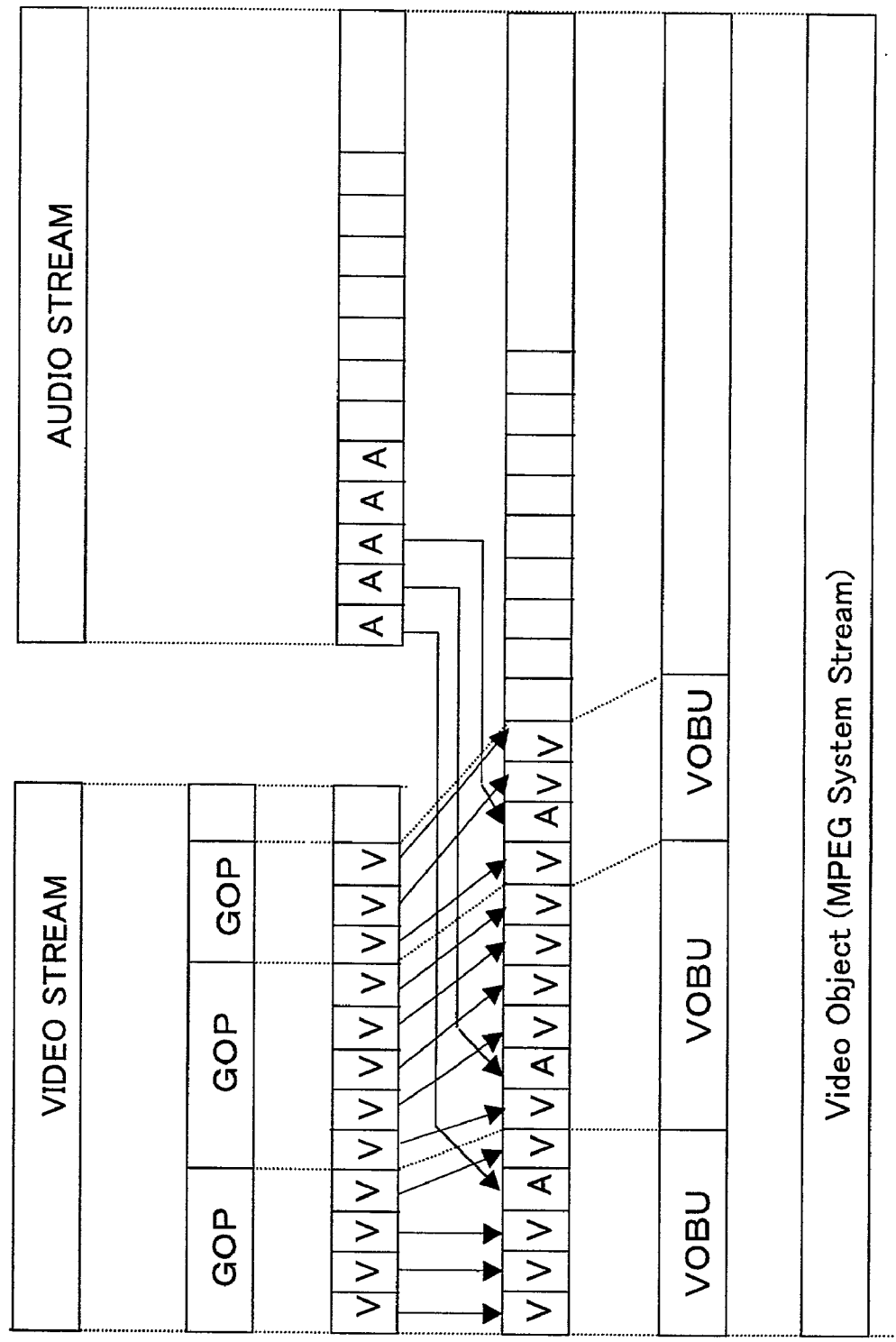
FIG. 7 shows the data structure of MPEG data content recorded to the disc.

FIG. 7 shows the structure of MPEG data recorded to a DVD disc as various types of AV objects.

As shown in FIG. 7 video and audio streams are divided and multiplexed. The multiplexed stream is referred to in the MPEG standard as the "system stream." In the case of a DVD disc, the system stream having DVD-specific data is called VOB (Video Object). Unit of division is called "pack packet" and has a capacity of approximately 2 Kbytes.

The video stream is encoded according to the MPEG standard and compressed at a variable bit rate such that the bit rate is increased in complex images containing, for example, much movement. Under the MPEG standard video pictures are encoded as an I-picture, P-picture, or B-picture. I-picture is spatially compressed and independently coded within a single frame without reference to any other pictures. P-picture and B-picture are temporally compressed with reference to correlation between frames. A block of pictures containing at least one I-picture is managed as a "group of pictures" (GOP) under the MPEG system. A GOP is used as an access point for special playback operations such as fast play because the GOP contains I-picture which is compressed within a frame.

Audio stream encoding for recording to DVD can be accomplished using the MPEG audio standards AAC and MP3, or using AC3 or LPCM encoding methods.

As shown in FIG. 7, the multiplexed data units containing the video data composing a GOP and the associated audio data are called VOBUs (Video Object Units) VOBU may contain data for managing the block of moving images as header data.

The system stream described in FIG. 7 includes a program stream (PS) and a transport stream (TS). The program stream has a data structure intended for recording to packaged media, while the transport stream data structure is intended for communications media.

Figure 8:
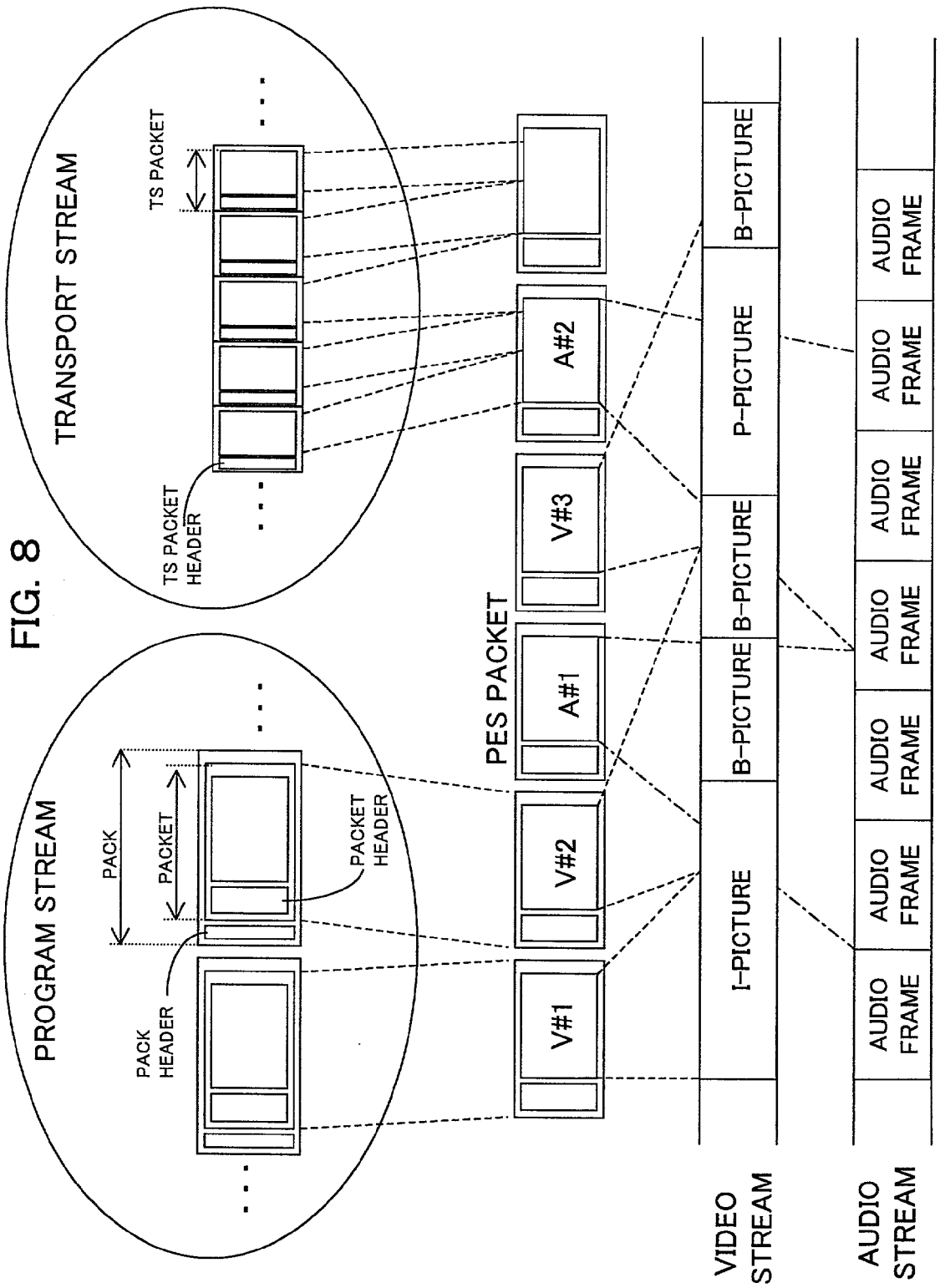
FIG. 8 shows the data structure of a program stream and a transport stream.

FIG. 8 shows the data structure of the program stream and transport stream.

The program stream comprises a number of fixed-length packs each of which is the smallest unit for transmission and multiplexing. Each pack contains one or more packets. Both of pack and packet have a header part and a data part. The data part is known in MPEG as the payload. The fixed length of the pack is 2 KB in DVD media to match the sector size. A pack can contain plural packets, but except for special circumstances one pack contains one packet because a pack storing DVD video or audio data has only one packet.

The unit for transport stream transmission and multiplexing comprises the fixed-length TS packets. TS packet size is 188 bytes for compatibility with the asynchronous transport mode (ATM) communication standard. One or more TS packets compose a PES packet.

The PES packet is a common concept between the program stream and the transport stream, and the data structure of the PES packet is also the same between the both streams. A packet stored in a program stream pack directly compose a PES packet, while one or more TS packets of the transport stream compose a PES packet.

The PES packet is the smallest encoding unit, and stores video data and audio data encoded using the same encoding method. That is, video data and audio data encoded with different coding methods are not contained in a same PES packet. It should be noted that if the same coding method is used, the picture boundary and audio frame boundary do not have to be assured. As shown in FIG. 8, a combination of plural PES packets may store a single I-picture, or a single PES packet may contain plural pictures.

Figure 9:
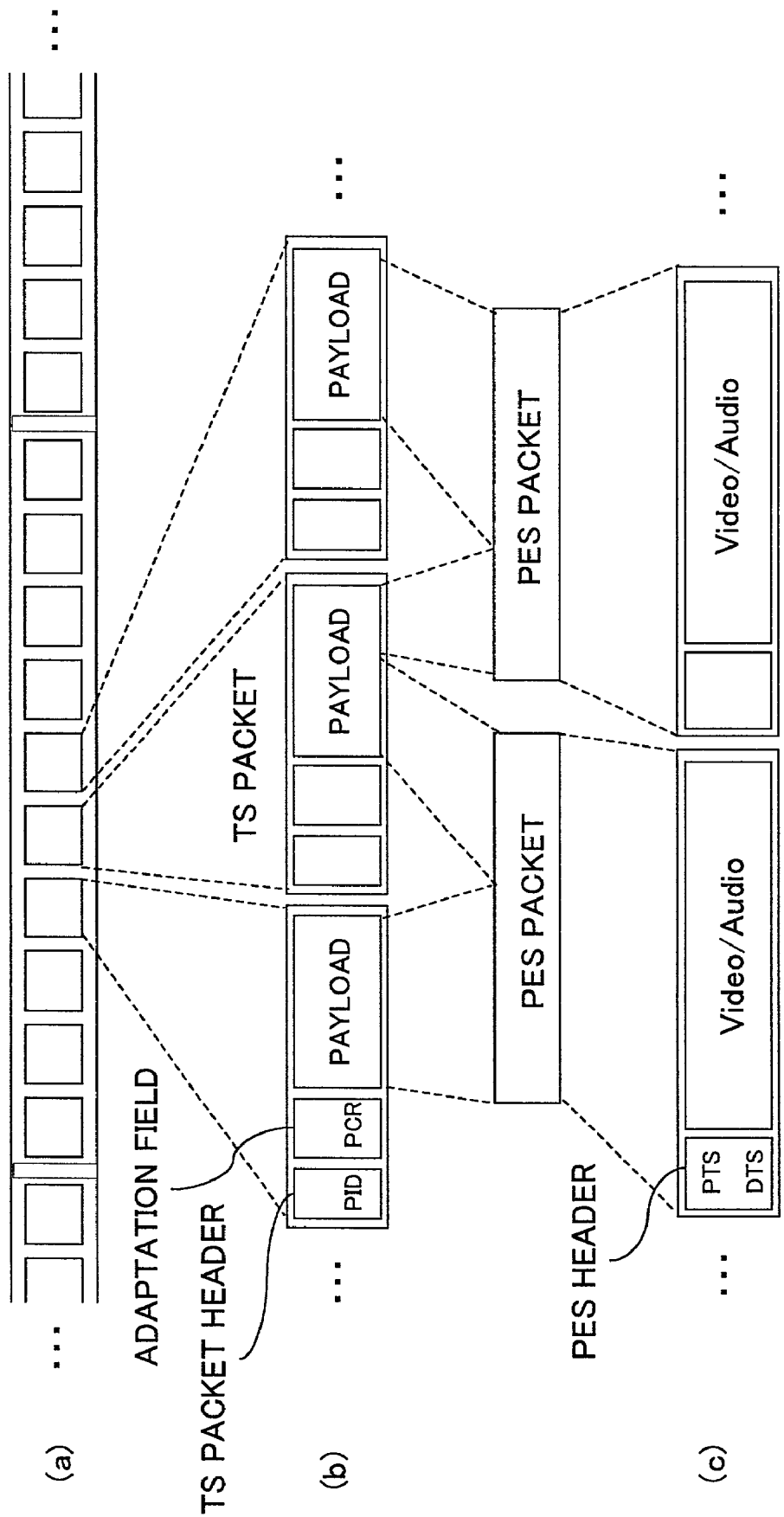
FIG. 9 shows the data structure of an MPEG transport stream.
Figure 10:
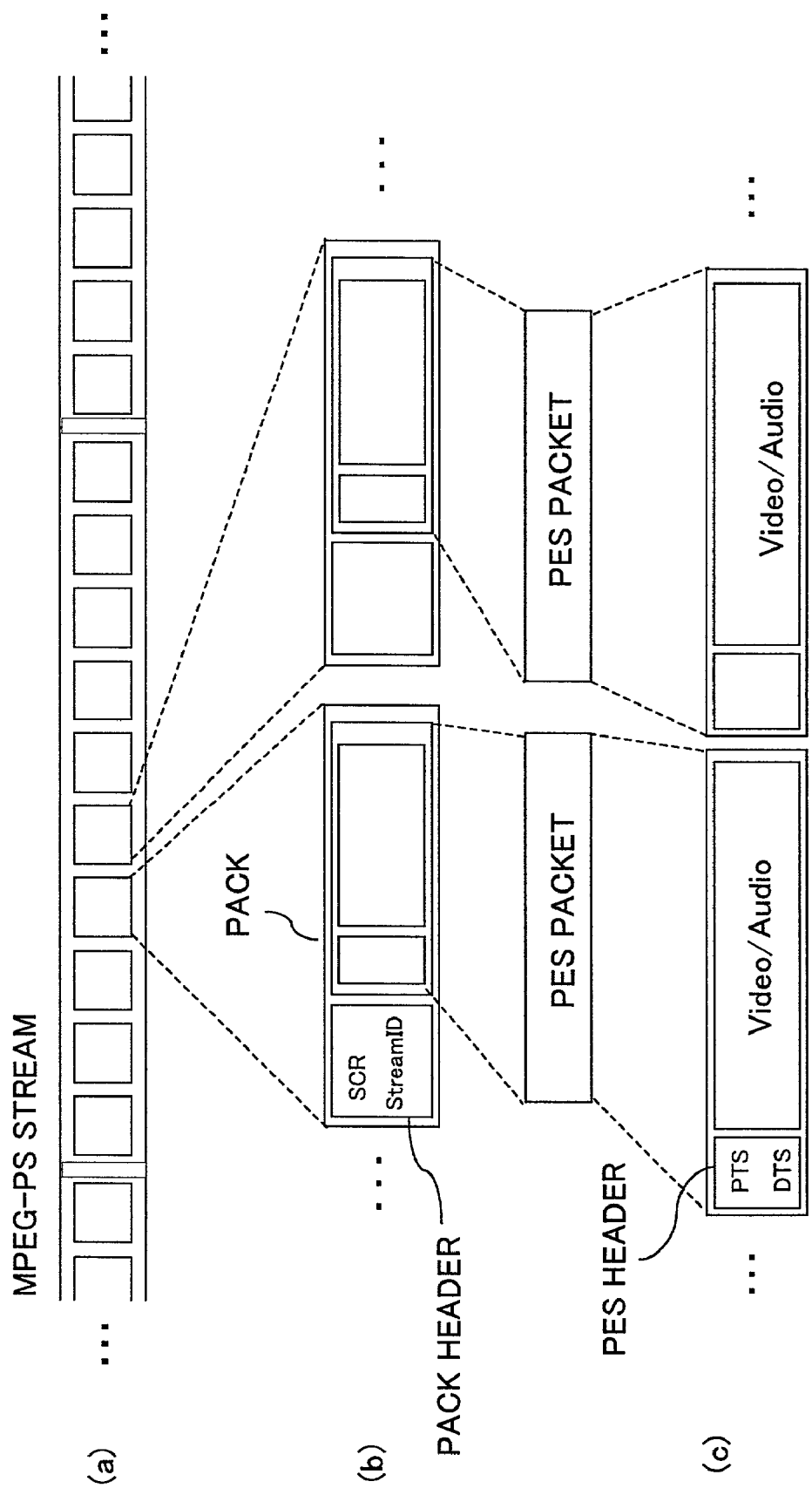
FIG. 10 shows the data structure of an MPEG program stream.

FIG. 9 and FIG. 10 show the individual data structures of the transport stream and program stream, respectively.

As shown in FIG. 9, a TS packet comprises a TS packet header, an application field, and payload. The TS packet header contains PID (Program ID) which identify several streams such as the video stream or audio stream to which the TS packet belongs.

The application field contains the program clock reference (PCR). The PCR is a value for a reference clock (STC) of a device which decodes the stream. The decoding device typically demultiplexes the system stream at the timing controlled by the PCR, and then reassembles to the several streams such as the video stream.

The PES header contains a decoding time stamp (DTS) and a presentation time stamp (PTS). The DTS indicates the decode timing for the picture or audio frames stored in the PES packet, and the PTS indicates the presentation timing for video and audio output.

It should be noted that the PTS and DTS are not necessarily written to all PES packet headers. Decoding and output can be accomplished insofar as the PTS and DTS are written to the header of the PES packet where the head data of the I-picture data is stored.

Figure 11:
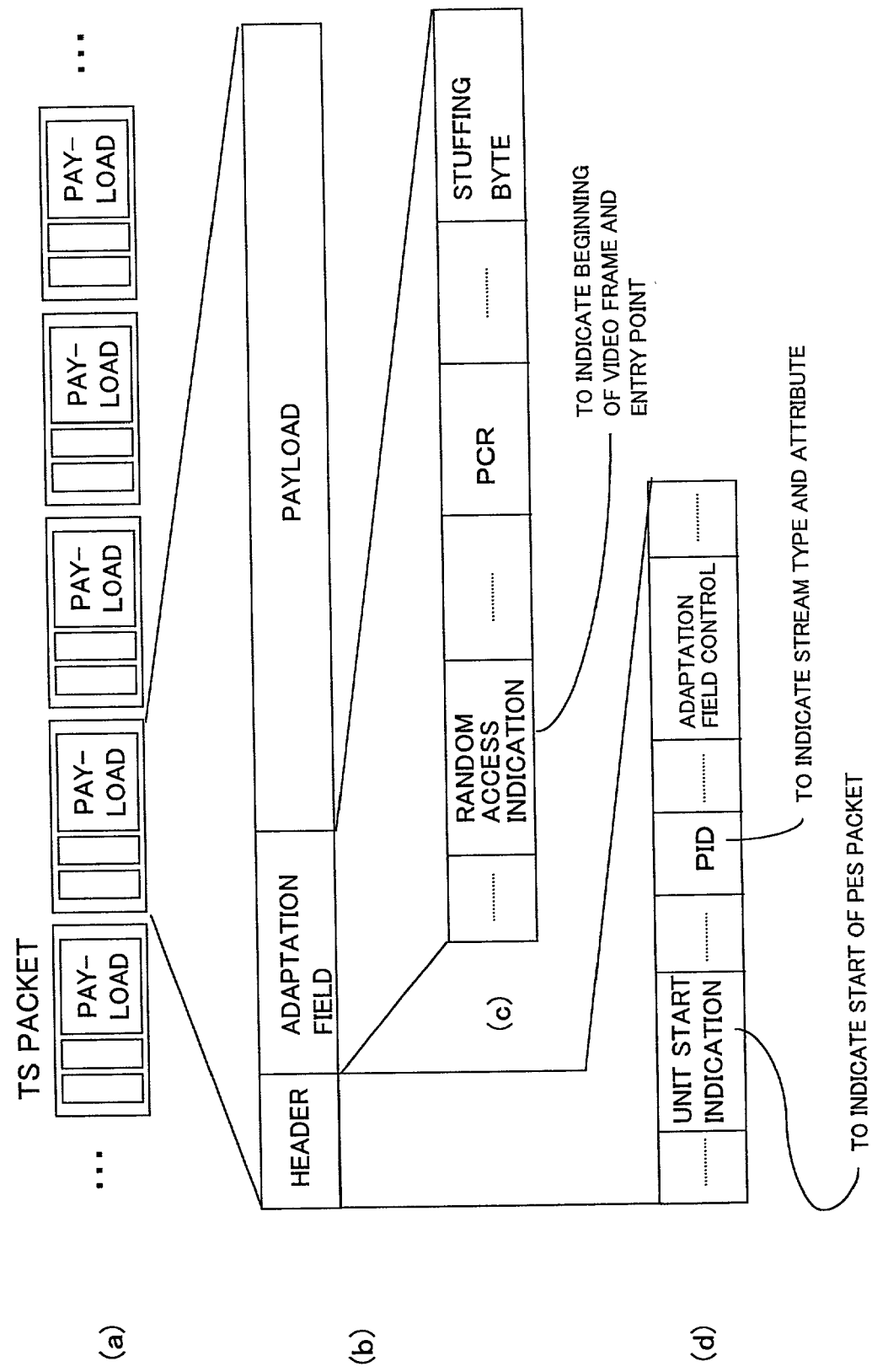
FIG. 11 shows in detail the structure of an MPEG transport stream packet.

The structure of the TS packet is shown in detail in FIG. 11.

As shown in FIG. 11, a random access presentation flag is stored to the application field in addition to the PCR. This flag indicates whether or not data which is the head of the video/audio frame and can be used as an access point is stored to the corresponding payload. Furthermore, the TS packet header stores, in addition to the above-described PID, a unit start presentation flag indicating the start of a PES packet, and application field control data indicating whether an application field follows.

FIG. 10 shows the structure of the packs composing the program stream. The pack header of each pack contains an SCR and Stream ID. The SCR is substantially the same as PCR of the transport stream, and the Stream ID is substantially the same as the PID. Because the PES packet data structure is the same as in the transport stream, the PTS and DTS are also stored in the PES packet header.

A major difference between the program stream and transport stream is that the transport stream allows multiple programs. In other words, while the program stream can carry only one program, the transport stream is designed to carry plural programs at the same time. It is therefore necessary for a reproducing apparatus to be able to identify either the video stream or audio stream composing a program for each program in the transport stream.

Figure 12:
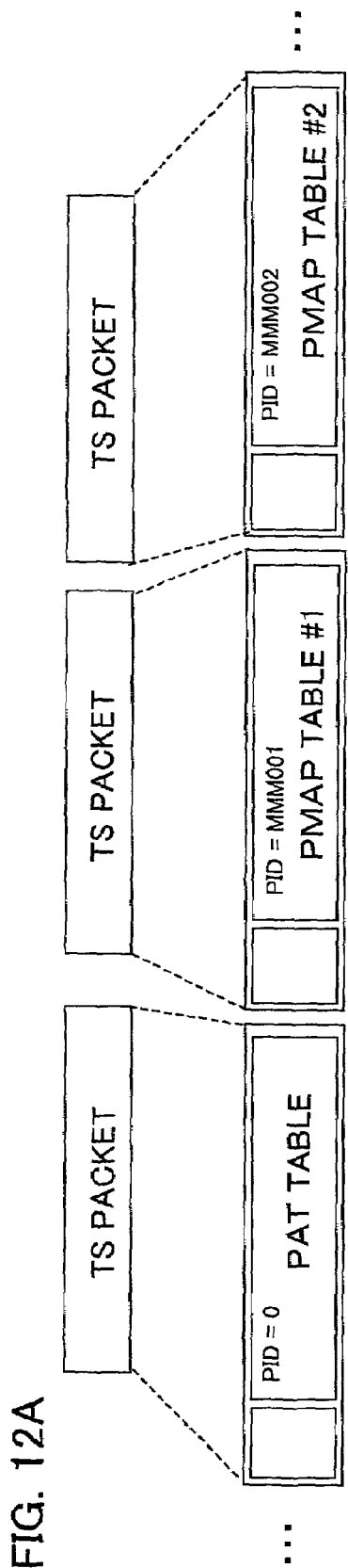

FIGS. 12A to 12C show the PAT table and PMAP table containing the audio stream and video stream structure of each program. As shown in these figures, the PMAP table stores information relating to a combination of video stream and audio stream which are used for each program, and the PAT table stores information relating to a combination between programs and PMAP tables. The reproducing apparatus can detect the video stream and the audio stream which are composing a program that is requested to output using the PAT table and PMAP table.

Arrangement of packs of the program stream and TS packets of the transport stream on the disc is described next with reference to FIGS. 13A and 13B.

Figure 13:
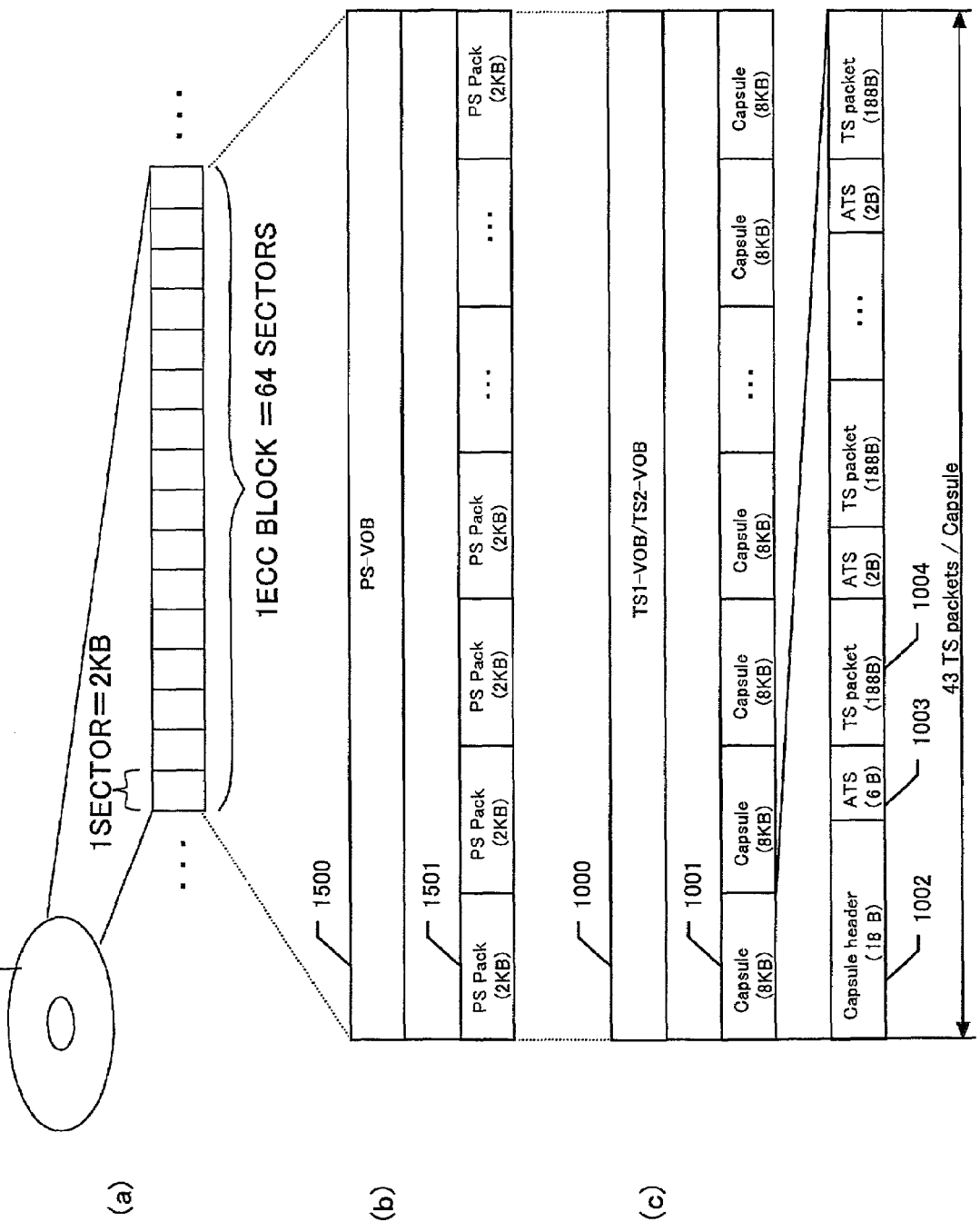
FIG. 13 describes the video object structures in a program stream format and in a transport stream format included in an ECC block.

As shown in FIG. 13A, an ECC block comprises 64 sectors. As shown in FIG. 13B, the PS packs composing the video object (PS_VOB) in the program stream format are placed at the sector boundary. This is because both the pack size and sector size is 2 KB.

Video object (TS1_VOB, TS2_VOB) in the transport stream format is arranged in ECC block in a unit of 8 KB which is called capsule. Each capsule has an header area of 18 byte and a data area. The data area contains forty three TS packets each containing an additional 6 byte block of ATS (Arrival Time Stamp) information. The ATS information is information generated and added by the DVD recorder, and indicates the timing at which the packet was sent to the DVD recorder from an external source.

(5. AV Data Management Information and Playback Control)

FIGS. 14A and 14B and FIGS. 15A and 15B show the data structure of the file referred to as a video management information (Video Manager file) shown in FIG. 6.

The Video Manager file contains object information which is management information including locations on the disc where the objects are recorded, and playback control information indicating the playback sequence of the plural objects.

Figure 14A:
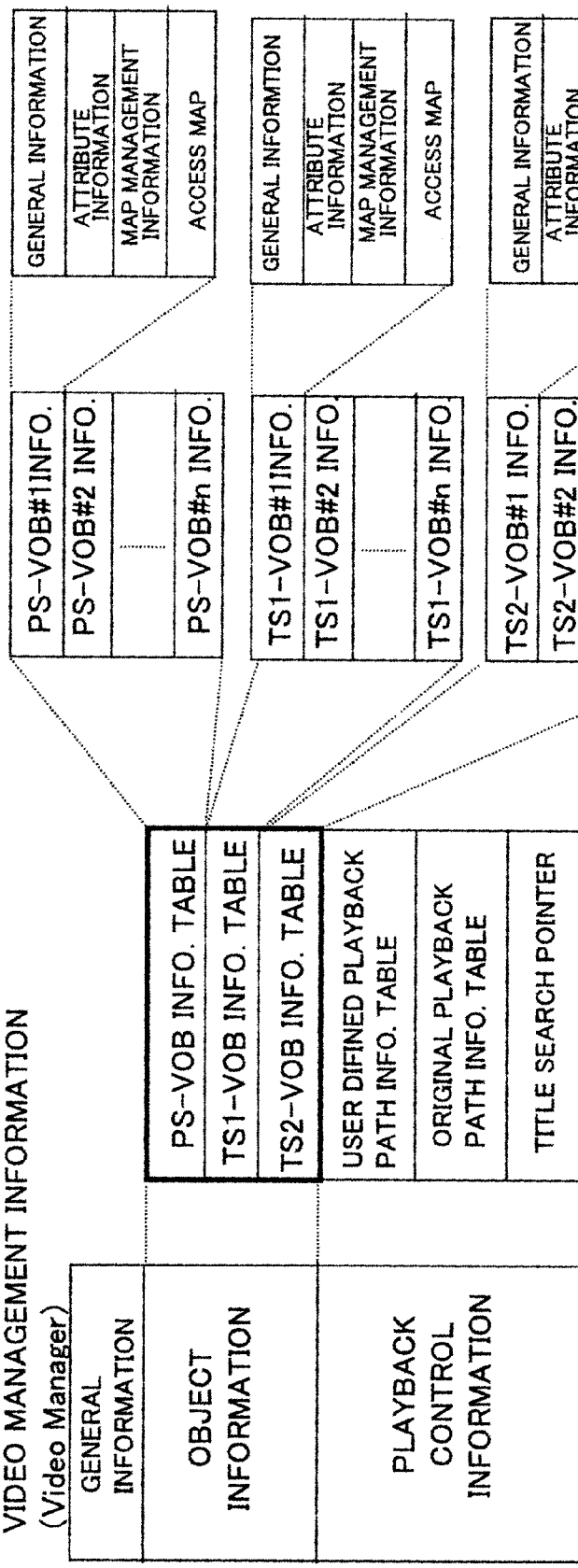
FIG. 14A describes the data structure of the video management information (video manager), focusing on the VOB table.

In the example shown in FIG. 14A, the objects recorded to disc include PS_VOB#1 to PS_VOB#n, TS1_VOB#1 to TS1_VOB#n, and TS2_VOB#1 to TS2_VOB#n.

As shown in FIG. 14A, as the object information, there are a PS_VOB information table, TS1_VOB information table, and TS2_VOB information table, respectively, depending upon the object type. Each table contains VOB information for each object.

The respective VOB information includes general information about the corresponding object, attributes information of the object, an access map for converting playback time of the object to a disc address, and access map management information. The general information includes identification data for the corresponding object, object recording time and so on. The attribute information include video stream information (V_ATR) containing coding mode of the video stream, the number of audio streams (AST_Ns), and audio stream information (A_ATR) including coding mode of the audio stream.

There are two reasons why the access map is required. First is to enable the playback path information to determine where an object is recorded on the disc indirectly based on the object playback time, and thus avoid directly accessing objects using, for example, a sector address. In RAM medium, editing may change the location of objects recorded to RAM. In the case that the program chain information references the object location directly by means of the sector address and so on, the amount of playback path information to be updated upon the editing increases. However, if object locations are referenced indirectly based on the playback time, it is not necessary to update the playback path chain information when objects move, and it is only necessary to update the access map.

The second reason is that the AV stream generally has two references including a time-base axis and data (bit sequence) axis, and the correlation therebetween is not perfect. In the case of MPEG-2 video, an international standard for video stream coding, for example, a variable bit rate (enabling the bit rate to be adjusted according to image quality and complexity) is being most commonly used. In this case, there is no directly proportional relationship between the amount of data measured from the beginning of the stream and the playback time, and thus random access referenced to the time base is not possible. To solve this problem, the access map is used to convert between the time base and data (bit sequence) axis.

As shown in FIG. 14A, the playback control information includes a user-defined playback path information table, original playback path information table, and title search pointer.

As shown in FIG. 15A, there are two playback paths including playback path information which is originally defined and playback path information freely defined by the user. The originally defined playback path information is generated automatically by the DVD recorder upon recording each object so as to specify all the recorded objects. The user-defined playback path information can be defined by the user to specify a desired playback sequence. This playback path information is uniformly referred to as program chain information (PGC information) in DVD media field, the user-defined program chain information is referred to as U_PGC information, and the original program chain information as O_PGC information. The O_PGC information and U_PGC information both compile a sequence of cell information in table form. The cell information is information indicative of a cell designating a playback section of a particular object, in table form. The playback section of the object indicated by the O_PGC information is referred to as a original cell (O_CELL), and the playback section of the object indicated by the U_PGC information is referred to as a user cell (U_CELL).

The cell indicates the playback section of the object using playback start time and playback end time of the object. The start time and end time are converted by the above-noted access map to the actual recording location of the object on the disc.

As shown in FIG. 15B, the cells defined by the PGC information provide a playback sequence in which each object designated by the corresponding cell is reproduced in sequential order according to the entry order in the PGC information table.

Figure 16:
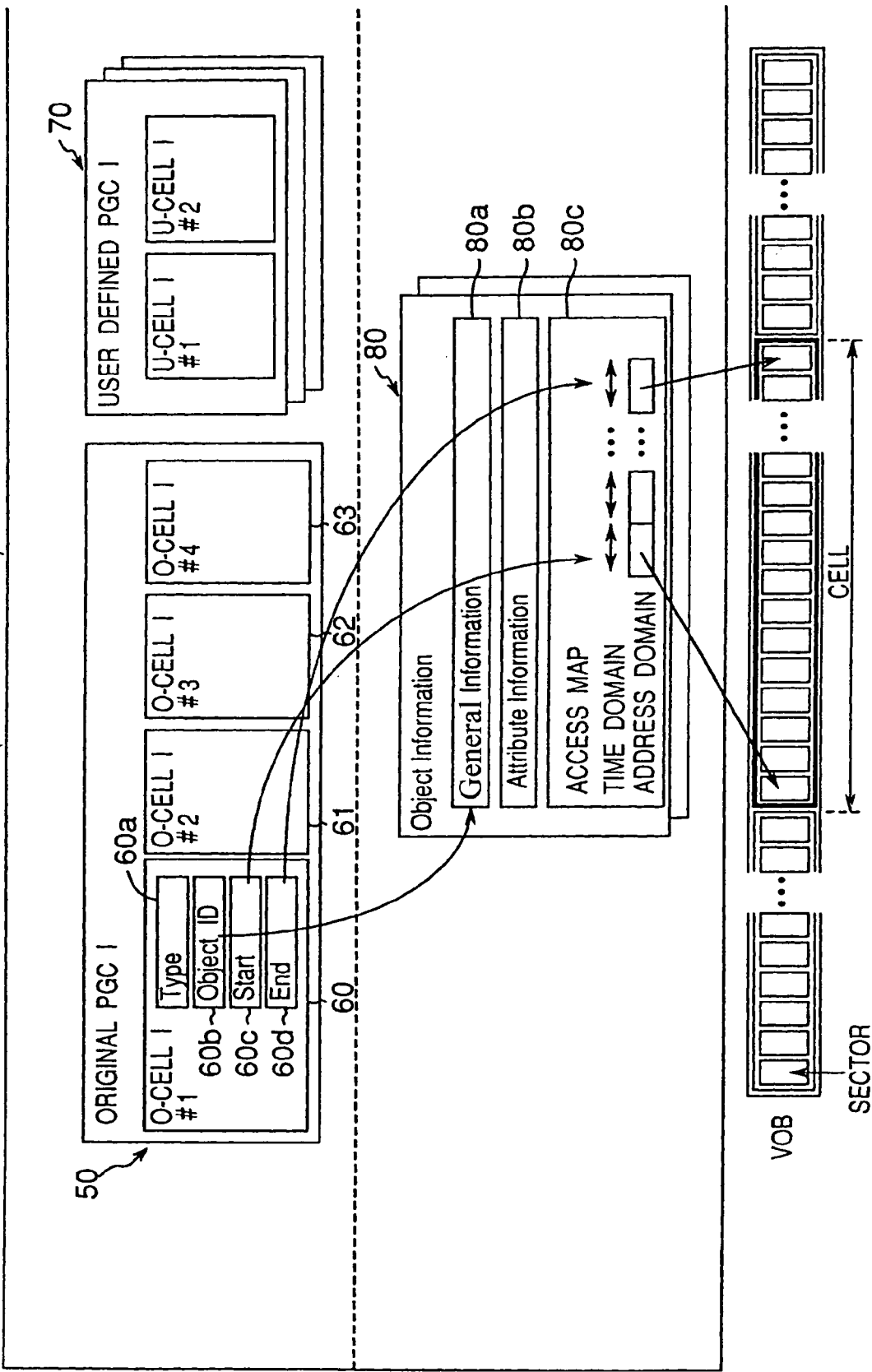
FIG. 16 shows the specific relationship among objects, cells, program chain, and access map.

FIG. 16 shows the concrete relationship between objects, cells, PGC, and access map.

As shown in FIG. 16, PGC information 50 includes at least one of cell information 60, 61, 62, 63. Cell information 60, , , specifies the object to be played back (reproduced), and further specifies the object type and playback section of the object. The sequence in which the cell information is recorded in the PGC information 50 determines the playback order of the cells designated by the corresponding cells.

The cell information 60 contains type information (Type) 60a indicating the object type, Object ID 60b identifying the object, start time information (Start_PTM) 60c indicating the start time of the cell in the object on the time base, and end time information (End_PTM) 60d indicating the end time of the cell in the object on the time base.

When the data is played back, cell information 60, 61, , , in the PGC information 50 is read in sequence, and the object specified by each cell is reproduced for the playback section specified by the cell.

The access map 80c converts the object start and end times stored in the cell information 60, 61, , , to location information on the disc.

The map information is generated and recorded at the same time as the objects are recorded. The structure of the pictures in the object data must be analyzed in order to generate the map. More specifically, it is necessary to detect the location of the I-pictures (as shown in FIG. 8), and to detect the time stamp information such as PTS which is the playback time of the corresponding I-picture as shown in FIG. 9 and FIG. 10.

Problems that occur when generating the PS_VOB, TS1_VOB, and TS2_VOB map information are described next.

As described with reference to FIG. 1, PS_VOB and TS1_VOB are primarily generated when the DVD recorder encodes a received analog broadcast signal to an MPEG stream. The I-pictures and time stamp data are thus generated by the DVD recorder during the encoding process, the internal data structure of the stream being clearly defined and known to the DVD recorder. Therefore, there are no problems generating the map information by the DVD recorder.

TS2_VOB, however, is obtained when a received digital broadcast is recorded directly to the disc without further encoding by the DVD recorder. The DVD recorder thus does not generate the I-picture location and time stamp data as it does when recording PS_VOB. As a result, the internal data structure of the stream is not obvious to the DVD recorder, and this information must be detected from the recorded digital stream.

Therefore, for the map information of the TS2_VOB, the DVD recorder detects I-pictures and the time stamp data as follows.

First, I-picture is detected by detecting random access indicating information (random_access_indicator) in the application field for TS packet (as shown in FIG. 11). The time stamp is detected by detecting the PTS of the PES header. For the time stamp, PCR in the application field, or ATS, which is the arrival time of the TS packet to the DVD recorder, can be used instead of the PTS as the time stamp. In either case, the DVD recorder does not analyze the data structure of the video layer of the MPEG stream, but detects the location of I-pictures using system layer information which is above the video layer. This is because analyzing the video layer to generate the map information imposes significant overhead on the system.

There are also cases in which system layer detection is not possible. It is not possible to generate the map information in such cases, and it is therefore necessary to indicate that there is no valid map information. This is indicated by the DVD recorder using the map management information shown in FIG. 14B.

Figure 14B:
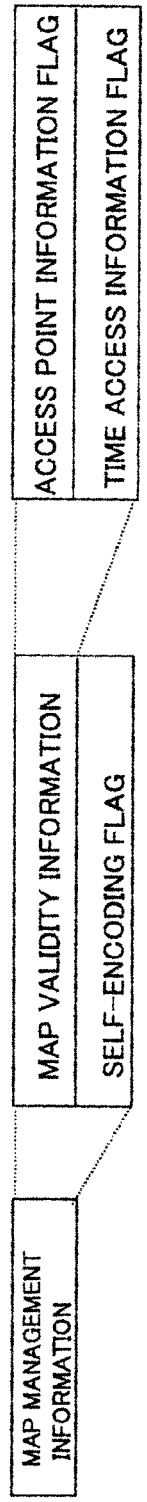
FIG. 14B shows the data structure of the map information.

As shown in FIG. 14B, the map management information contains map validity information and a self-encoding flag. The self-encoding flag shows that the object was encoded by the DVD recorder itself, that the internal picture structure is clear, and that the time stamp information and I-picture location information in the map information are accurate. The map validity information indicates if there is a valid access map available.

Examples of cases in which the system layer cannot be detected may include when the application field is not provided, or when the original digital stream is not an MPEG transport stream. Different digital broadcasting system are likely to be adopted in different countries, and therefore there will likely be cases in which the DVD recorder records objects for which a map cannot be generated. For example, if a DVD recorder designed for digital broadcasts in Japan is used in the United States to record a digital broadcast in the United States, there may be cases in which objects for which a map cannot be generated will be recorded.

The DVD recorder however will still be able to sequentially reproduce from the beginning of objects for which map information cannot be generated. In this case, it is possible to reproduce the video by passing the recorded digital stream through a digital interface to an STB operable to process the digital stream.

To summarize, there are four possible cases as shown in FIG. 17 depending upon (a) whether the recorded stream is a program stream or transport stream, (b) whether the stream is self-encoded, and (c) whether I-picture (access unit) detection or address detection is possible. Note that an open circle "O" in FIG. 17 indicates the condition indicated by the column is satisfied, and an "X" indicates the condition is not satisfied.

Four different access maps as shown in FIG. 18 are thus compiled corresponding to the four cases shown in FIG. 17. The types of access maps are described below. As shown in FIG. 18, the access maps can be grouped into one of four types according to the level of recording stream analysis.

i) Access Map #1

This access map is compiled and used in case that the recorder analyzes the internal structure of the recording stream when the access map is generated, and access unit location and playback time information can therefore be obtained. This access map manages the playback time of the access unit and disc address of the access units with byte level precision.

ii) Access map #2

This access map is compiled and used in case that the recording stream is a transport stream and is self-encoded, that the location of access units is managed in each block of a fixed size of 2 bytes or more, and that the playback time can be detected. The access map manages the playback time of the access unit and a block storing the access unit, relating those.

iii) Access map #3

This access map is compiled and used in the case that the recording stream is a transport stream and is self-encoded, that the location of access unit is managed in each block of a fixed size of 2 bytes or more, but that the playback time cannot be determined. The access map manages the arrival time of packets containing the access unit and a block storing the access unit, relating those.

iv) Access map #4

This access map is compiled and used in case that the recording stream is a transport stream and is self-encoded, but that it is unclear whether the location of access unit is managed in each block of a fixed size of 2 bytes or more, and that the playback time cannot be determined. The access map manages the arrival time of particular packets. The map validity information flag is set to "invalid" in this case.

It is thus possible to generate and select an access map appropriate to the recording stream based on analysis level of the internal structure of the recording stream. Random access and stable data playback can be achieved when these access maps are used to reproduce an optical disc to which a transport stream is recorded.

(6. Basic Operation of the Playback Function)

The playback operation of a DVD recorder/player for playing back an optical disc as described above is described below with reference to FIG. 19.

Figure 19:
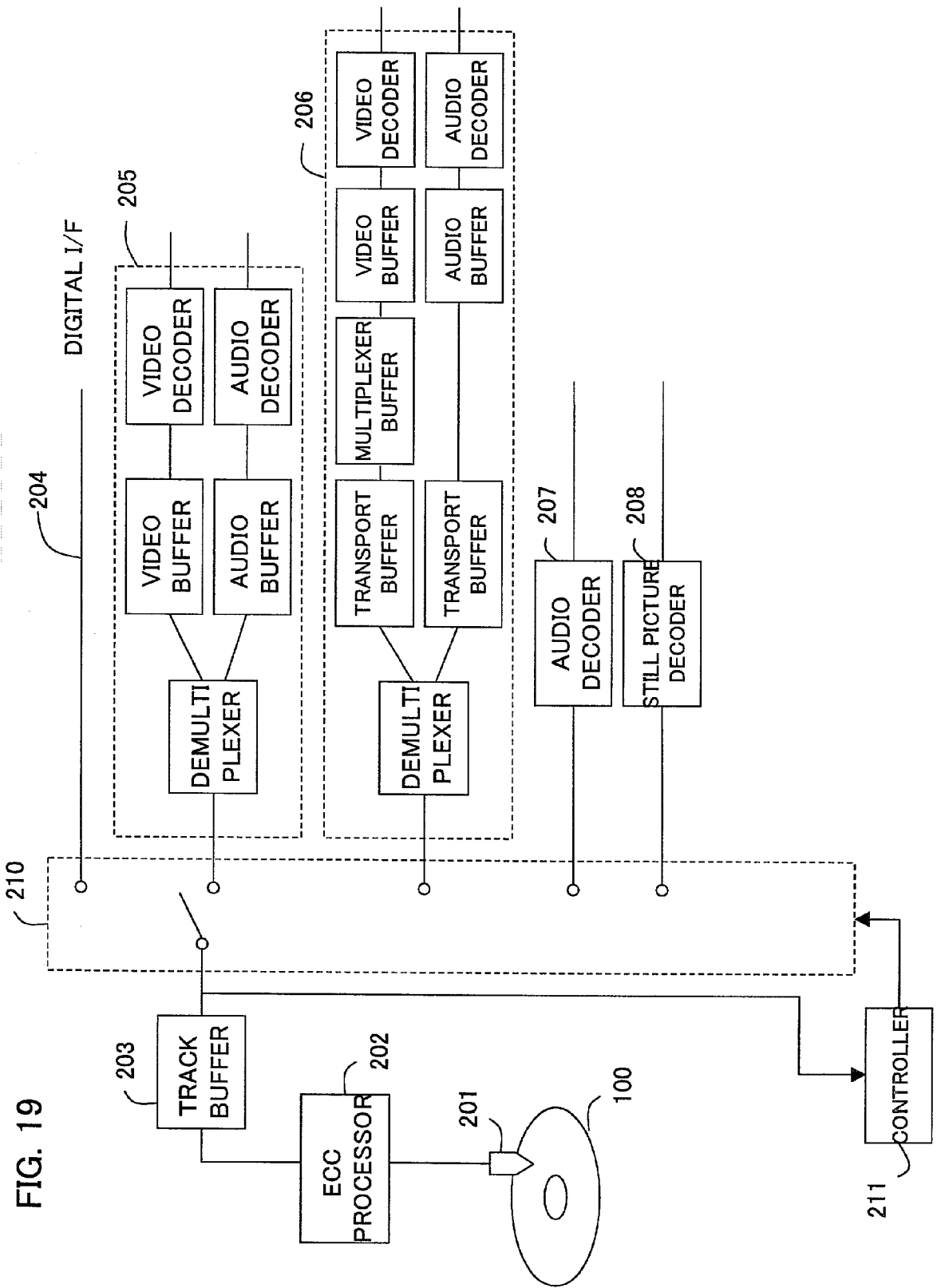
FIG. 19 is a block diagram of a model player according to the present invention.

As shown in FIG. 19 the DVD player has an optical pickup 201 for reading data from optical disc 100, ECC processor 202 for error correction of the read data, track buffer 203 for temporarily storing the read data after error correction, PS decoder 205 for reproducing program streams, including video objects (PS_VOB), TS decoder 206 for reproducing the transport stream of digital broadcast objects (TS1_VOB), audio decoder 207 for reproducing audio objects (AOB), still picture decoder 208 for decoding still picture objects (POB), selector 210 for switching data input to the decoders 205 to 208, and controller 211 for controlling the various components of the player.

The data recorded on the optical disc 100 is read by optical pickup 201, passed through ECC processor 202, and stored to track buffer 203. The data stored in the track buffer 203 is then input to one of the decoders, that is, PS decoder 205, TS decoder 206, audio decoder 207, or still picture decoder 208 to be decoded and output.

The controller 211 decides what data to be read at this time based on the playback sequence indicated by the program chain information (PGC) such as shown in FIG. 15. Using the example shown in FIG. 15, the controller 211 controls reading so as to first reproduce a partial section (cell#1) in VOB#1, then reproduce a partial section (cell#2) in VOB#3, and finally reproduce a partial section (cell#3) in VOB #2.

The controller 211 can also obtain the cell types to be reproduced, the corresponding objects, and the playback start time and end time of each object using the cell information of the program chain (PGC) as shown in FIG. 16. The controller 211 uses the cell information to input the data for the objects identified by the cell information to the appropriate decoder.

The player according to this preferred embodiment of the invention also has a digital interface 204 for supplying the AV stream to an external device. This makes it possible to supply the AV stream to an external device using a communication protocol such as IEEE 1394 or IEC 958. This is because the player may not have the decoder needed to decode a TS2_VOB stream that was not encoded by the player, in which case the player can directly output the stream via the digital interface 204 to an external STB for reproduction by that STB.

When digital data is output directly to the external device, the controller 211 determines whether random access reproduction is possible based on the map information such as shown in FIG. 14B. If the access point flag is valid, the access map contains location information of an I-picture. This enables the controller 211 to output to the external device via the digital interface 204 digital data containing an I-picture when there is a request from the external device for fast forward playback or other special playback operation. Time-base access is also possible if the time access flag is valid. This flag enables the controller 211 to output to the external device via the digital interface 204 digital data containing the picture data corresponding to a specified playback time when a request is received from the external device to access and play the stream starting at a particular point of time in the stream.

(7. Basic Operation of the Recording Function)

The configuration and operation of a DVD recorder according to the present invention for recording and reproducing an optical disc are described next below with reference to FIG. 20.

Figure 20:
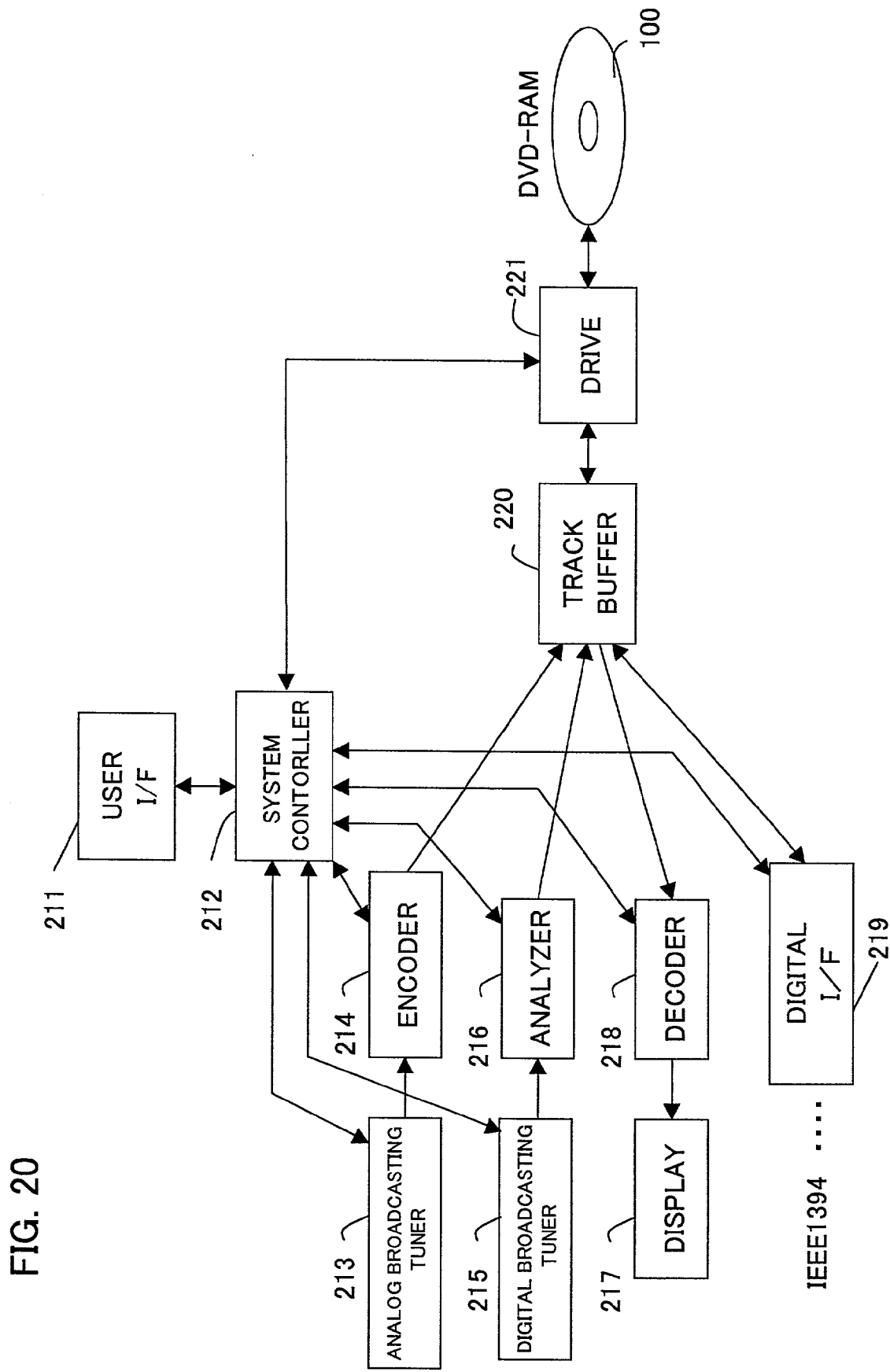
FIG. 20 is a block diagram of a DVD recorder.

As shown in FIG. 20, this DVD recorder has a user interface 211 whereby information is presented to the user and instructions are received from the user, a system controller 212 for managing and controlling overall operation of the DVD recorder, an analog tuner 213 for receiving VHF and UHF signals, an encoder 214 for converting analog signals to digital signals to encode into an MPEG program stream, a digital tuner 215 for receiving digital satellite broadcasts; an analyzer 216 for analyzing the MPEG transport stream received from a digital broadcast satellite, a display unit 217 such as a television and speakers, and a decoder 218 for decoding the AV stream. The decoder 218 includes, for example, both the first and second decoders shown in FIG. 14.

The DVD recorder also has a digital interface 219, track buffer 220 for temporarily storing the write data, and a drive 221 for writing data to DVD-RAM disc 100. Note that the digital interface 219 is used for outputting data to an external device according to a communication protocol such as IEEE 1394.

With a DVD recorder thus comprised, the user interface 211 first receives a request from the user. The user interface 211 then passes this request to the system controller 212, and the system controller 212 then interprets the request and sends requests to appropriate components of the DVD recorder.

Let us first consider recording a PS_VOB when a request to record an analog broadcast is received from the user.

In this case, the system controller 212 instructs the analog tuner 213 to receive the broadcast and instructs the encoder 214 to encode the broadcast signal.

The encoder 214 video-encodes, audio-encodes, and system-encodes the AV data received from the analog tuner 213, and then passes the encoded output to the track buffer 220.

Immediately after encoding starts, encoder 214 sends the playback start time (PS_VOB_V_S_PTM) of the MPEG program stream being encoded to the system controller 212, and then sends the time-base length and size of the video object unit (VOBU) to the system controller 212 parallel to the encoding process in order to generate the T map.

The system controller 212 then outputs a record instruction to the drive 221, which in turn reads data from the track buffer 220 and writes to DVD-RAM disc 100. The system controller 212 also gives the drive 221 instruction to indicate the location on the disc 100 where the data is recorded, based on the file system allocation data.

Recording is ended by a stop request from the user. The user inputs a stop recording request to the system controller 212 through the user interface 211, and the system controller 212 then instructs the analog tuner 213 and encoder 214 to stop.

When the stop encoding request from the system controller 212 is received, the encoder 214 sends the playback end time (PS_VOB_V_E_PTM) of the MPEG program stream last encoded to the system controller 212.

After the recording process ends, the system controller 212 generates the video object information (PS_VOBI) based on the information received from encoder 214.

Cell information is then generated for this video object information (PS_VOBI), but what is important to note here is that the cell type is set to "PS_VOB". As described above, data written in the cell information is not dependent on the video object (PS_VOB), and all data that depends on the video object (PS_VOB) is hidden in the video object information (PS_VOBI). Normal playback is therefore not possible if the cell type information is not correctly detected, and in some cases incorrect cell type detection could cause the system to crash.

Finally, the system controller 212 instructs the drive 221 to finish recording the data in the track buffer 220, and instructs the drive to record the video object information (PS_VOBI), cell information, and playback time base information. The drive 221 thus records the remaining data in the track buffer 220, records video object information (PS_VOBI) and the cell information to DVD-RAM disc 100, and ends the recording process.

It will also be obvious that the analog broadcast can be encoded to a TS1_VOB stream.

Further obviously, encoding is skipped when recording a TS2_VOB stream that is recorded without encoding.

Analyzer 216 first extracts the start time information (D_VOB_V_S_PTM) from the MPEG transport stream and sends it to the system controller 212 in order to generate the digital broadcast object information (TS2_VOBI). The object units (VOBU) in the MPEG transport stream are then determined, and the time-base length and size of the object units needed for T map generation are sent to the system controller 212. Note that the object units (VOBU) can be determined by detecting the random_access_indicator in the adaptation field of the TS packet header as described above.

The system controller 212 then sends a record instruction to the drive 221. The drive 221 then reads data from the track buffer 220 and records it to the DVD-RAM disc 100. The system controller 212 also tells the drive 221 where the data is recorded on the disc 100 based on the file system allocation data.

Recording ends when a stop recording request is received from the user. The stop recording request is passed from the digital interface 219 to the system controller 212, which in turn provides requests for stopping process of the digital tuner 215 and the analyzer 216.

The analyzer 216 stops stream analysis when the stop request is received from the system controller 212, and sends the final presentation end time (D_VOB_V_E_PTM) of the video object unit (VOBU) last analyzed in the MPEG transport stream to the system controller 212.

After receiving a digital broadcast ends, the system controller 212 generates the digital broadcast object information (D_VOBI) based on this information received from the analyzer 216. Cell information corresponding to this digital broadcast object information (D_VOBI) is then generated with the cell attribute field set to "D_VOB". Playback time information is also generated.

Finally, the system controller 212 instructs the drive 221 to finish recording the data stored to the track buffer 220, and to record the digital broadcast object information (D_VOBI), cell information, and playback time information. The drive 221 thus records the remaining data in the track buffer 220, the digital broadcast object information (D_VOBI), cell information, and playback time information to the DVD-RAM disc 100, and then the recording process ends.

It will be obvious that while the above operation is described based on start and stop recording requests input by the user, DVD recorder operation is substantially the same when a timer recording function such as available on VCR decks is applied to record automatically, in which case the start and stop requests are generated automatically by the system controller instead of the user.

(Playback by DVD Recorder)

The playback operation of the DVD recorder is described next.

The user interface 211 receives a request from the user. The user interface 211 passes the request from the user to the system controller 212, which then interprets the request to send control commands to the appropriate modules. When the user request is to playback PGC, the system controller 212 interprets the PGC information and cell information to determine which objects are to be reproduced. Note that the following description assumes an original PGC including one video object (M_VOB) and one cell information.

The system controller 212 first analyzes the attribute information contained in the cell information of the PGC information. It is known that the AV stream to be reproduced is an AV stream recorded as an MPEG program stream if the attribute information is set to "M_VOB".

The system controller 212 then extracts the associated video object information (M_VOBI) from a table (M_AVFIT) based on ID of the cell information. Next, the start and end addresses of the AV data to be reproduced are obtained from the start and end addresses of the cell information, the video object start time (M_VOB_V_S_PTM) and end time (M_VOB_V_E_PTM), and T map.

The system controller 212 then sends to the drive 221 a request for reading data from the DVD-RAM disc 100 with the address to be read. The drive 221 then reads the AV data from the address indicated by the system controller 212, and stores the data to the track buffer 220.

The system controller 212 then requests the decoder 218 to decode the MPEG program stream. The decoder 218 reads and decodes the AV data from the track buffer 220. The decoded AV data is then output through the display unit 217.

The drive 221 tells the system controller 212 when it has read all data specified by the system controller 212. The system controller 212 then sends a stop playback request to the decoder 218. The decoder 218 continues reproducing the data until the track buffer 220 is emptied. Once the track buffer 220 is empty and all buffered data has been decoded and reproduced, the decoder 218 reports to the system controller 212 that the reproduction (playback) has finished, and the playback process ends.

The above operation is described using an original PGC consisting of one video object (M_VOB) and one cell information. However AV stream playback can be accomplished using the same process when the original PGC contains only one digital broadcast object (D_VOB), contains plural video objects, contains plural digital broadcast objects, or contains a combination of video objects and digital broadcast objects.

Audio objects (AOB) and still picture objects (S_VOB) can also be reproduced using the same basic operation and modules, except that the internal configuration of the decoder 218 will differ somewhat. In this case, the decoder 218 comprises PS decoder 205, TS decoder 206, audio decoder 207, and still picture decoder 208.

A case in which the decoder 218 has no ability to reproduce any AV streams is described next.

If the decoder 218 does not have the ability to reproduce the MPEG transport stream, the MPEG transport stream cannot be reproduced by the decoder 218. In this case, the data is supplied to an external device by way of the digital interface 219 for reproduction by the external device.

When the system controller 212 detects that the cell information in the PGC that the user wants to play is a digital broadcast object (D_VOB) not supported by the system, the system controller 212 sends a data output request to the digital interface 219 instead of sending a playback request to the decoder 218. The digital interface 219 then outputs the AV data stored to the track buffer 220 according to the communication protocol of the connected digital interface. Other than this, operation is the same as when reproducing a video object (M_VOB).

The system controller 212 can also determine whether the decoder 218 can handle the AV stream to be reproduced, or the system controller 212 can ask the decoder 218 if it can decode the AV stream.

(DVD Player)

The configuration of a DVD player according to the present invention for reproducing an optical disc is described next with reference to FIG. 21. This DVD player is an embodiment of the above described player model.

Figure 21:
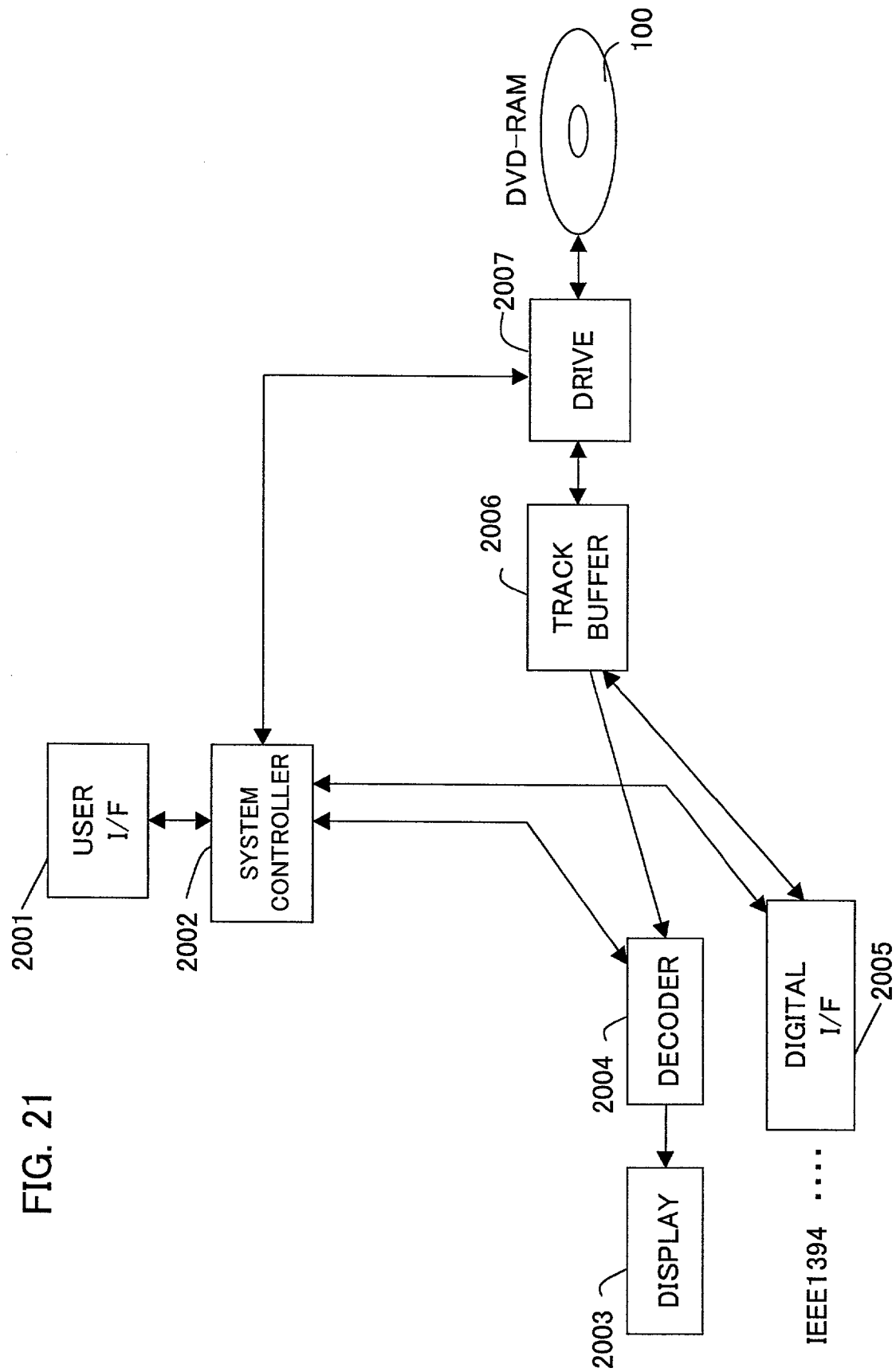
FIG. 21 is a block diagram of a DVD player according to the present invention.

As shown in FIG. 21, this DVD player has a user interface 2001 whereby information is presented to the user and instructions are received from the user, a system controller 2002 for managing and controlling overall operation of the DVD recorder, a display unit 2003 such as a television and speakers, a decoder 2004 for MPEG stream decoding, a digital interface 2005 for providing an IEEE 1394 or other connection, a track buffer 2006 for temporarily storing data read from DVD-RAM disc 100, and a drive 2007 for reading data from DVD-RAM disc 100. The DVD player thus comprised performs the same playback operation as the DVD recorder described above.

It will be obvious that while this embodiment is described using DVD-RAM media by way of example, the same operations can be applied to other types of media, and the present invention shall not be limited to DVD-RAM discs or other types of optical discs.

Furthermore, this embodiment is also described as reproducing an AV stream not supported by the decoder by passing the AV stream through the digital interface. It will also be obvious that even AV streams supported by the decoder can be output to an external device through the digital interface in response to an appropriate user request.

Furthermore, the audio data and still picture data are described as being non-MPEG stream data, but the MPEG system stream can also be used for audio data and still picture data.

Second Embodiment

The second embodiment of the present invention is described next below using exemplarily DVD recorder and DVD-RAM media.

The basic configuration and operation of a DVD recorder and DVD-RAM media in this embodiment are the same as described above in the first embodiment. Further description thereof is thus omitted below. The following description focuses particularly on the structure of the access map for a digital broadcast object (D_VOB) which is of a data object type used for digital broadcasts.

(PCR Map and PTS Map)

Figure 22A:
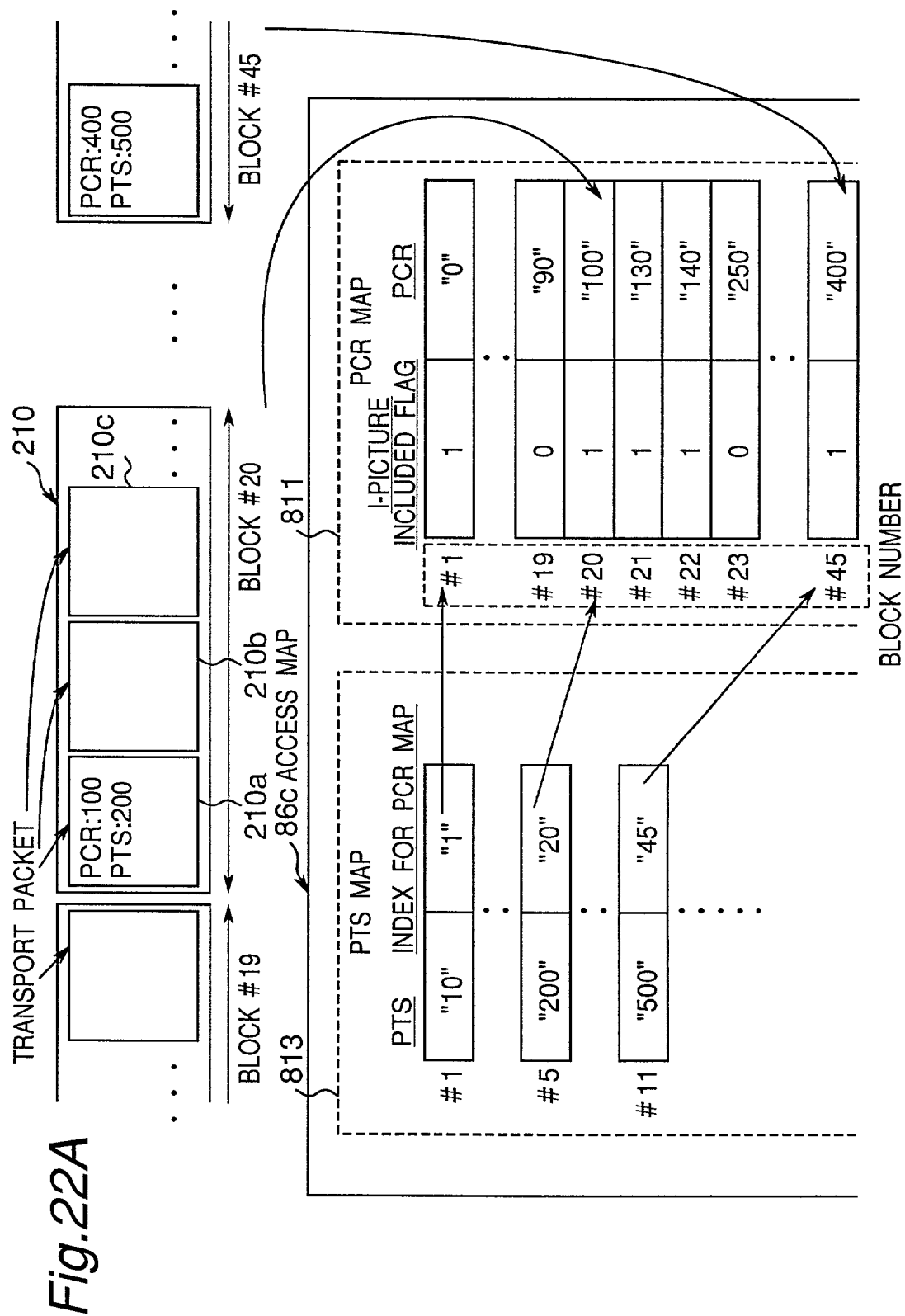
FIG. 22A shows the basic configuration of an access map for a digital broadcast object (D_VOB)

An access map in this embodiment of the invention is shown in FIG. 22A and described below. As shown in FIG. 22A, access map 86c has two map layers, PCR map 811 and PTS map 813.

When recording a digital broadcast object (D_VOB) to disc, the stream is recorded referenced to the ECC block. This means that stream recording always starts from the leading sector in the ECC block.

The access map manages objects in block units containing a specific number (N) of ECC blocks where N is an integer of 1 or more and is fixed within the stream. This unit of N blocks that is used as the management unit of the access map is referred to below as simply a "block." One block contains a plurality of transport packets. In the example shown in FIG. 22A, the twentieth block 210, for example, contains plural transport packets 210a, 210b, 210c, and so forth.

PCR map 811 is a table in which the entries correspond to the blocks. There are, therefore, as many table entries as blocks. PCR map 811 manages a Program Clock Reference (PCR) and I-picture Included Flag for each entry. The PCR is attached to the transport packet disposed to the beginning of the block to which the entry refers, and the I-picture Included Flag is associated with the same block.

The PCR indicates the input time of the data to the decoder. The I-picture Included Flag indicates whether I-picture data of the MPEG video data is included in the block. I-picture Included Flag with a value of "1" means that the block contains an I-picture, in this exemplary embodiment. The twentieth entry in PCR map 811 shown in FIG. 22A, for example, contains the value ("100") of the PCR attached to the first transport packet 210a in the twentieth block 210, and the I-picture Included Flag (=1) to the twentieth block 210.

PTS map 813 is a table for managing the Presentation Time Stamp (PTS) of each I-picture in a digital broadcast object (D_VOB). More specifically, PTS map 813 stores the PTS for each I-picture, and an index value to the block number of the block in which the I-picture is stored. If the I-picture is stored across plural blocks, the index points to only the number of the first block where the I-picture is stored. It is known from PCR map 811 in FIG. 22A that I-pictures are stored from blocks 20 to 22. In this case, the fifth entry to PTS map 813 stores, as an index, number ("20") of the first block in the group of blocks in the PCR map containing I-pictures, and the PTS ("200") of the same first block.

As shown in FIG. 22A, PCR map 811 has one entry per block, and the order of the entries in PCR map 811 corresponds to the number of the block which each entry points. Therefore, in the index for PCR map, the block number of the block corresponding to PTS is specified using the sequence number of the PCR entry in the PCR map 811.

Figure 22B:
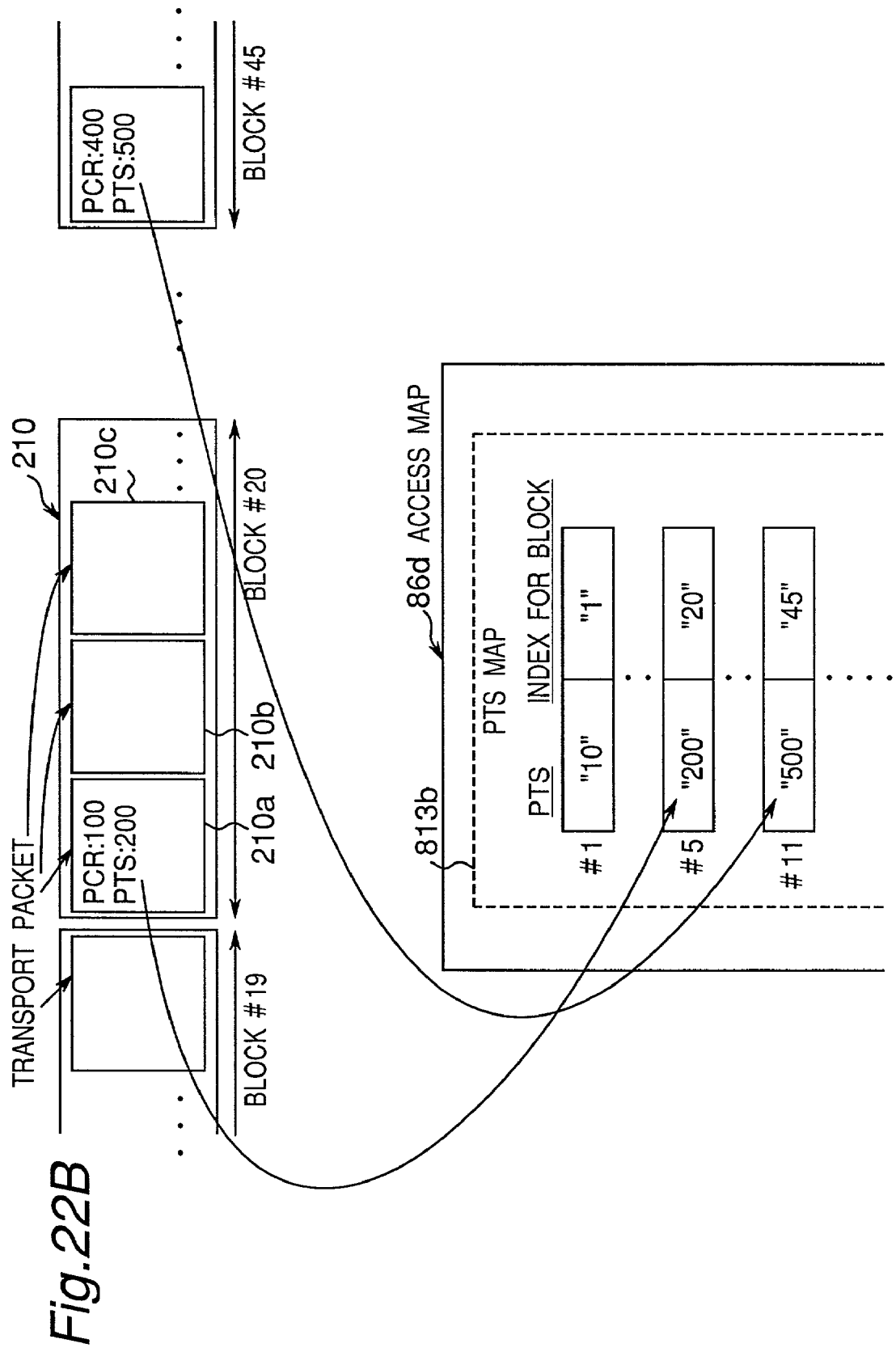
FIG. 22B shows another configuration of an access map for a digital broadcast object (D_VOB)

When the PTS information is available, it is also possible to generate only the PTS map as shown in FIG. 22B. The PTS map 813b generated in this case contains data pairs including the PTS time information ("10", "200", and "500" in this example) and the location of the corresponding transport packets ("1", "20", and "45"). This PTS map 813b can be used to reproduce and control transport packet for reproduction. This PTS map 813b shows the location of the first or head packet in transport packets containing an I-picture. Since the access map 86d contains only the PTS map 813b pointing the first packet locations, using the PTS access map 86d offers the benefit of reducing the amount of management information in comparison with using the access map 86c shown in FIG. 22A.

It will also be apparent that while PCR map 811 is generated so that a flag is set for every block containing an I-picture in the case shown in FIG. 22A, the invention shall not be so limited. It is also possible to set the flag only for the first or last one of blocks containing an I-picture. This also offers the benefit of reducing the amount of management information.

It is also possible to control transport packet playback more efficiently and simply by using a table in which flags are set for only the first one of blocks containing an I-picture in combination with a table in which flags are set for only the last one of blocks containing an I-picture.

Furthermore, while PTS and PCR information are used as time information in the tables shown in FIG. 22A and FIG. 22B, it is alternatively possible to use ATS (Arrival Time Stamp) information indicating the timing when a packet is sent out from the DVD recorder.

(Playback Using the PCR Map and PTS Map)

A method for reproducing digital broadcast objects (D_VOB) from the PGC information using PCR map 811 and PTS map 813 is described next below with reference to FIG. 23.

The structure of the digital broadcast object information (D_VOBI) is described first. It should be noted that the structure of the digital broadcast object information (D_VOBI) in this embodiment is substantially identical to that described above in the first embodiment, and the differences therebetween are therefore described below.

Figure 23:
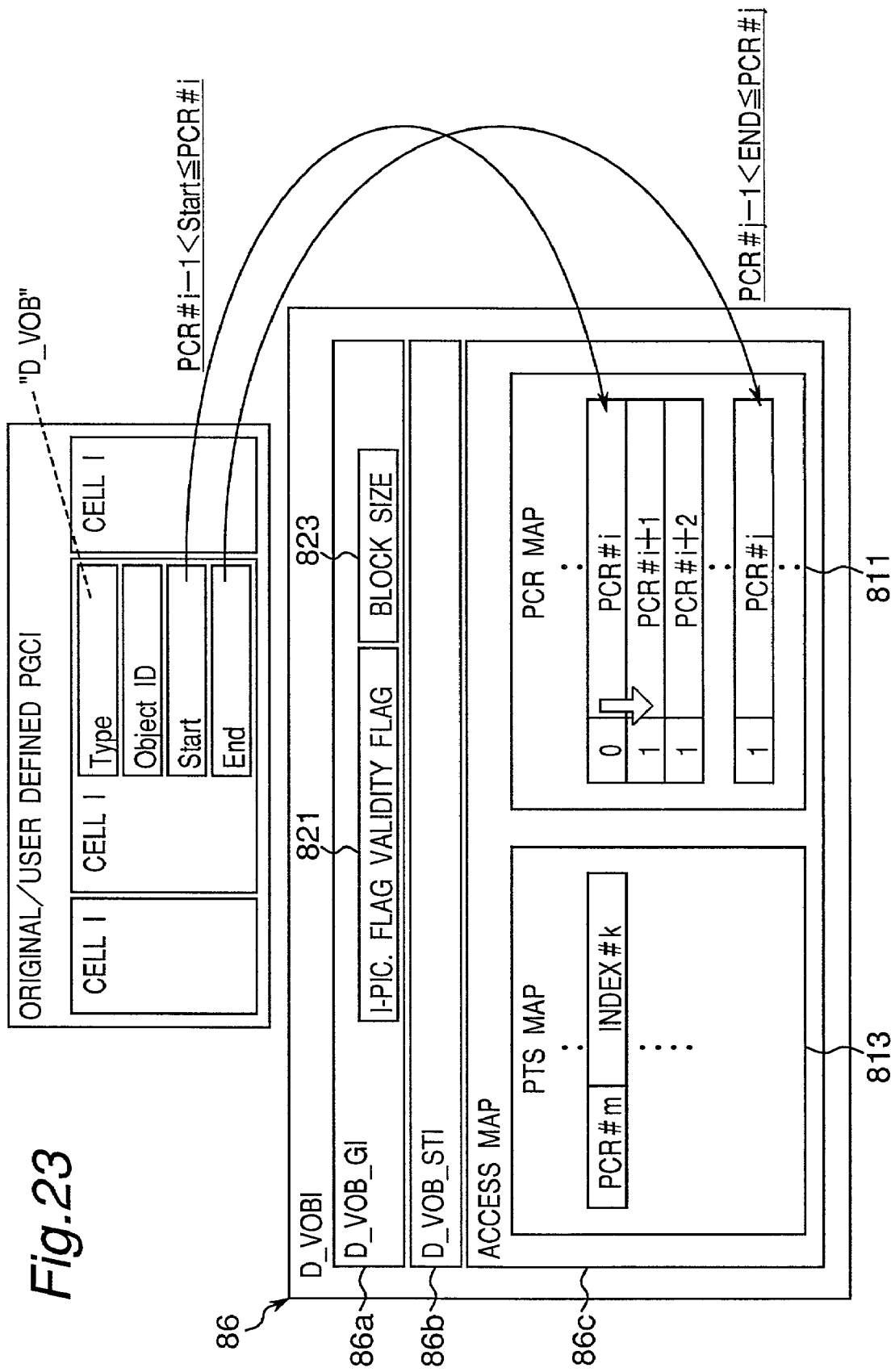
FIG. 23 shows the relationship between the access map and cells when replaying a digital broadcast object.

As shown in FIG. 23, digital broadcast object general information (D_VOB_GI) 86a contains an I-picture flag validity flag 821 and block size information (block size) 823.

The I-picture flag validity flag 821 indicates the validity of the I-picture Included Flag in each of the above-noted PCR entries. Block size information 823 indicates the block size, which consists of N ECC blocks as noted above.

I-picture flag validity flag 821 identifying the validity of the I-picture Included Flag is provided so that the validity of the I-picture Included Flag can be determined so as to prevent erroneous recognition of the I-picture Included Flag during playback when the transport stream is recorded without the transport stream being analyzed and I-picture locations identified.

A digital broadcast object playback procedure is described next below.

The structure of the program chain information (PGCI) and cell information (CellI) is the same as described in the first embodiment. However, the start and end position information (Start, End) of the digital broadcast objects stored in the cell information indicate the value of the PCR in the transport stream.

When the digital broadcast object is reproduced, the location to start reading the digital broadcast object is determined as follows based on the start address information stored to the cell information. When the cell information is stored in the user-defined PGC information, this start address indicates the desired start time specified by the user, and reading is thus by random access.

First, the time stored to the start address is compared with each PCR value stored to PCR map 811 to detect the i-th entry in the PCR map meeting the following condition.

$$\text{PCR \#}i-1 \leq \text{Start} \leq \text{PCR\#}i \quad (1)$$

where the PCR of the x-th entry is referred to PCR #x. The x-th entry is also referred to below as entry #x. In addition, the operation of referencing the PCR values to obtain the map entry corresponding to the start address information is referred to as "mapping."

The I-picture flag validity flag 821 of the digital broadcast object general information (D_VOB_GI) is then checked to determine if the flag 821 is valid. If it is, the I-picture Included Flag for PCR entry #i is checked. If an I-picture is not contained in the block (the flag value is "0"), the next PCR entry or PCR entry #i+1 is checked in the same way. This search continues forward (normal playback direction) until the first block in the group of blocks containing an I-picture is found.

If the I-picture Included Flag of the PCR entry #i first checked indicates that the corresponding block contains an I-picture (the flag value is "1"), then the search repeats in the direction of PCR entry #i−1 (that is, in reverse, opposite the normal playback direction) to find the head PCR entry for the I-picture. The block indicated by the PCR entry thus found is the block at which playback starts.

The time indicated by the end address information (End) in the cell information is then compared with each PCR value stored to PCR map 811 to detect entry #j in the PCR map satisfying the following condition. Thus, the last block to be reproduced can be identified.

$$\text{PCR \#}j-1 \leq \text{End} \leq \text{PCR \#}j \quad (2)$$

The start playback block and the end playback block identified by the above procedure are then converted to digital broadcast object (D_VOB) address values using the block size data in the digital broadcast object general information (D_VOB_GI), and then converted to the address of the file where the digital broadcast object is stored. The data is then read from this file using the obtained address, and the read data is decoded and reproduced.

The entry indicating the start playback block obtained from the PCR map 811 is then found in the PTS map 813 by cross-referencing the PCR map 811 entry to the PTS map 813 using the index. The decoder can be controlled so as to not present the input stream until the time indicated by the PTS by applying the PTS obtained by searching PTS map 813 to the decoder as the presentation start time.

It is also possible to determine the location of the playback blocks to reproduce data using an access map having only the PTS map shown in FIG. 22B.

It is also possible to determine the location of the playback blocks to reproduce the data by using an access map in which flags are set only for the first one of blocks containing an I-picture or set only for the last one of blocks containing an I-picture. The location of the block to be reproduced can be identified even more efficiently and data playback control can be yet further simplified, by combining a table in which flags are set only for the first one of the blocks with a table in which flags are set only for the last one of the blocks.

Random access playback of recorded digital broadcast objects can thus be achieved using an optical disc according to this preferred embodiment of the invention.

(Special Playback Operations)

An exemplary special playback operation, specifically fast-forward playback, is described next with reference to FIG. 24.

Special playback operations are accomplished by referencing the I-picture Included Flag described above. The maximum I-picture size is 224 KB, and I-picture is therefore generally segmented to and recorded to plural blocks. Special playback modes are therefore accomplished by reproducing units of consecutive PCR entries of which the I-picture Included Flags are set to "1".

Figure 24:
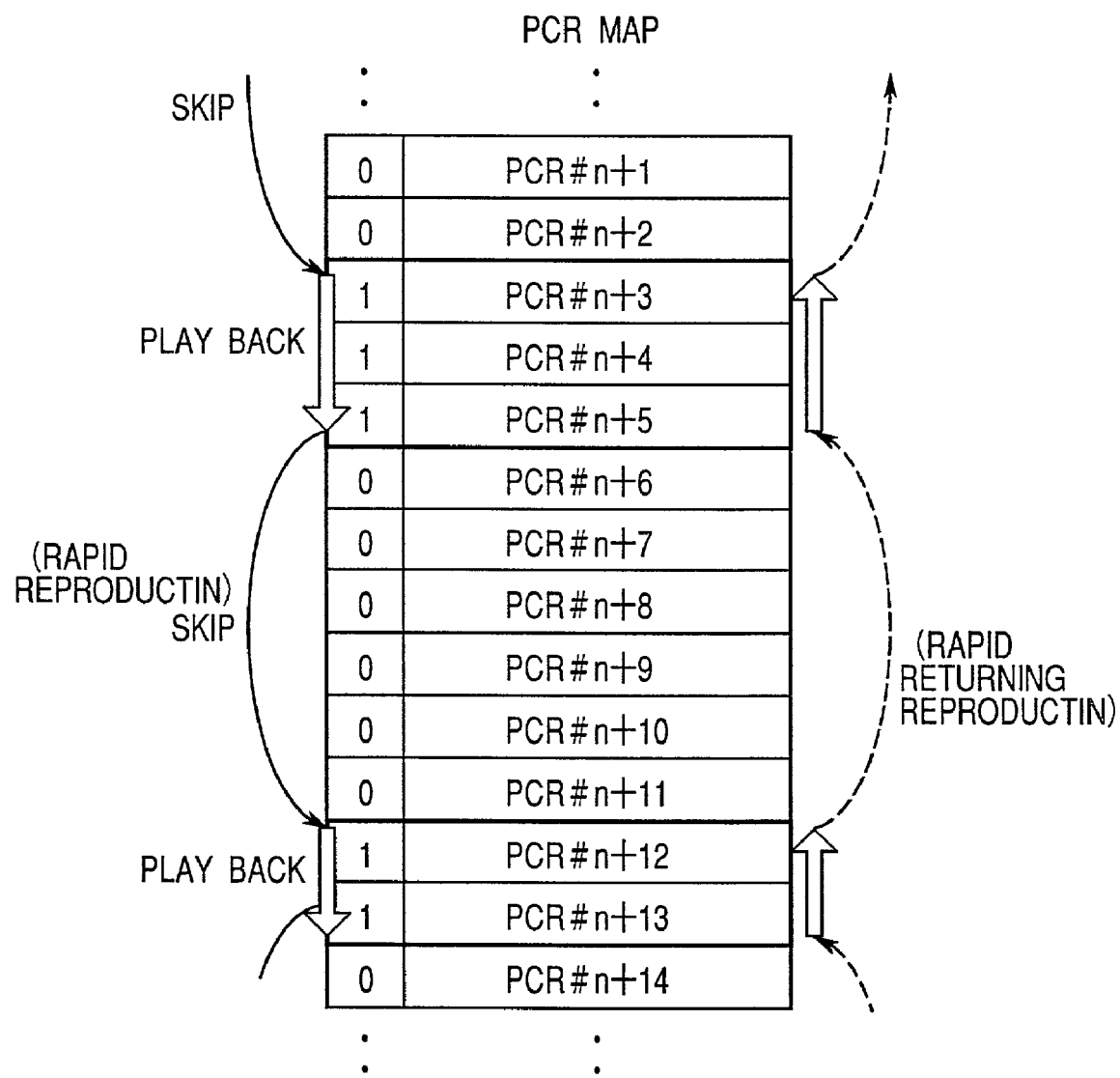
FIG. 24 describes a method of using the access map during special playback of a digital broadcast object.

Let us assume that in FIG. 24 the I-picture Included Flag is set for each PCR entry, for example. Playback unit of I-picture comprises PCR entries #n+3 to #n+5 in each of which the I-picture Included Flag is set on. Data corresponding to these entries are read from the storage file and decoded for reproduction. When reading the blocks corresponding to PCR entries #n+3 to #n+5 is finished, skip is made to PCR entry #n+12 where the next I-picture Included Flag is set on in order to reproduce the next I-picture. The above process can be repeated to perform various special playback operations such as fast-forward play as described above. It will also be obvious that fast play in reverse can be similarly accomplished by simply skipping the I-picture playback units in reverse.

(Erase Operation)

An erase operation is described next with reference to FIG. 25.

The method for detecting the erase interval is basically the same as during the playback process. That is, the PCR entries corresponding to the start and end positions specified by the user are found, and the I-picture Included Flag of the entry at the start of the erase interval is checked. It is important to note here that the block containing the beginning of the I-picture is not the block at which erasing starts (start erase block), but rather the block following immediately thereafter is the start erase block.

This is because the block containing the start of the I-picture also contains last data of the previous GOP (Group of Pictures). Therefore, if the block containing the start of the I-picture is erased, normal playback all the way to the end of the previous GOP will not be possible.

In the erasing operation, the same operation to the end block at which erasing ends (end erase block) is performed as that to the start erase block. That is, as shown in FIG. 25, if the I-picture Included Flag is set off at the PCR entry #n−1 specified by the user as the erase end location, the next entry following entry #n−1 of which the I-picture Included Flag is set on is tried to be found. When the next entry having the I-picture Included Flag set on is found, the block indicated by the PCR entry immediately before the found entry is used as the end erase block. In the example shown in FIG. 25, the PCR entry which follows entry #n−1 and first has the I-picture Included Flag set on is PCR entry #n+1, and therefore the block indicated by the entry #n immediately before the entry #n+1 is the end erase block. Yet more specifically, the blocks indicated by entries #1 to #n are erased.

On the other hand, if the I-picture Included Flag is set on for entry #n−1 indicated by the user as the end of the erase interval, then the PCR entry having the I-picture Included Flag turned off is searched for in the opposite direction, that is, the reverse direction. When the first PCR entry having the I-picture Included Flag turned off is found, the block indicated by that PCR entry is designated as the end erase block.

After the start and end erase blocks are identified as described above, the data stored from the start erase block to the end erase block is deleted, and the PCR entries corresponding to those blocks are deleted from the PCR map 811.

Figure 25:
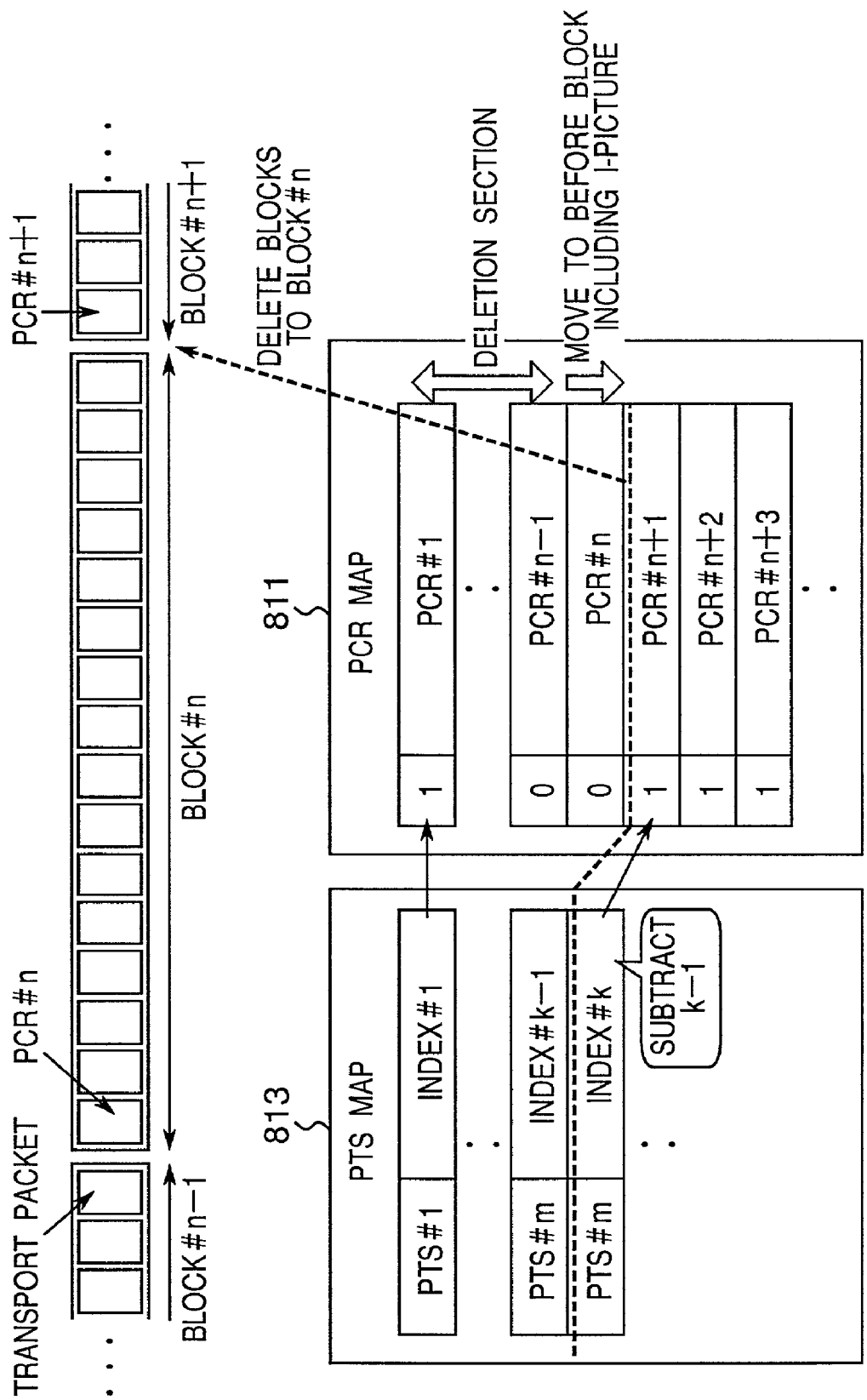
FIG. 25 shows the relationship between the access map and stream when deleting a digital broadcast object.

As shown in FIG. 25, the PTS entries in PTS map 813 pointing to the PCR entries deleted from the PCR map are also deleted, and the index numbers of the remaining PTS entries are decremented by the number of deleted PTS entries.

When a middle part of a digital broadcast object (D_VOB) is deleted so that a front portion and a rear portion of the digital broadcast object remain, entries corresponding to the deleted portion are erased from the PCR map and PTS map for the front portion of the digital broadcast object. For the rear portion of the digital broadcast object, the entries to the deleted portion are likewise erased from the corresponding PCR map and PTS map, and the index numbers in the PTS map are likewise adjusted as described above.

(Multistream)

Figure 26:
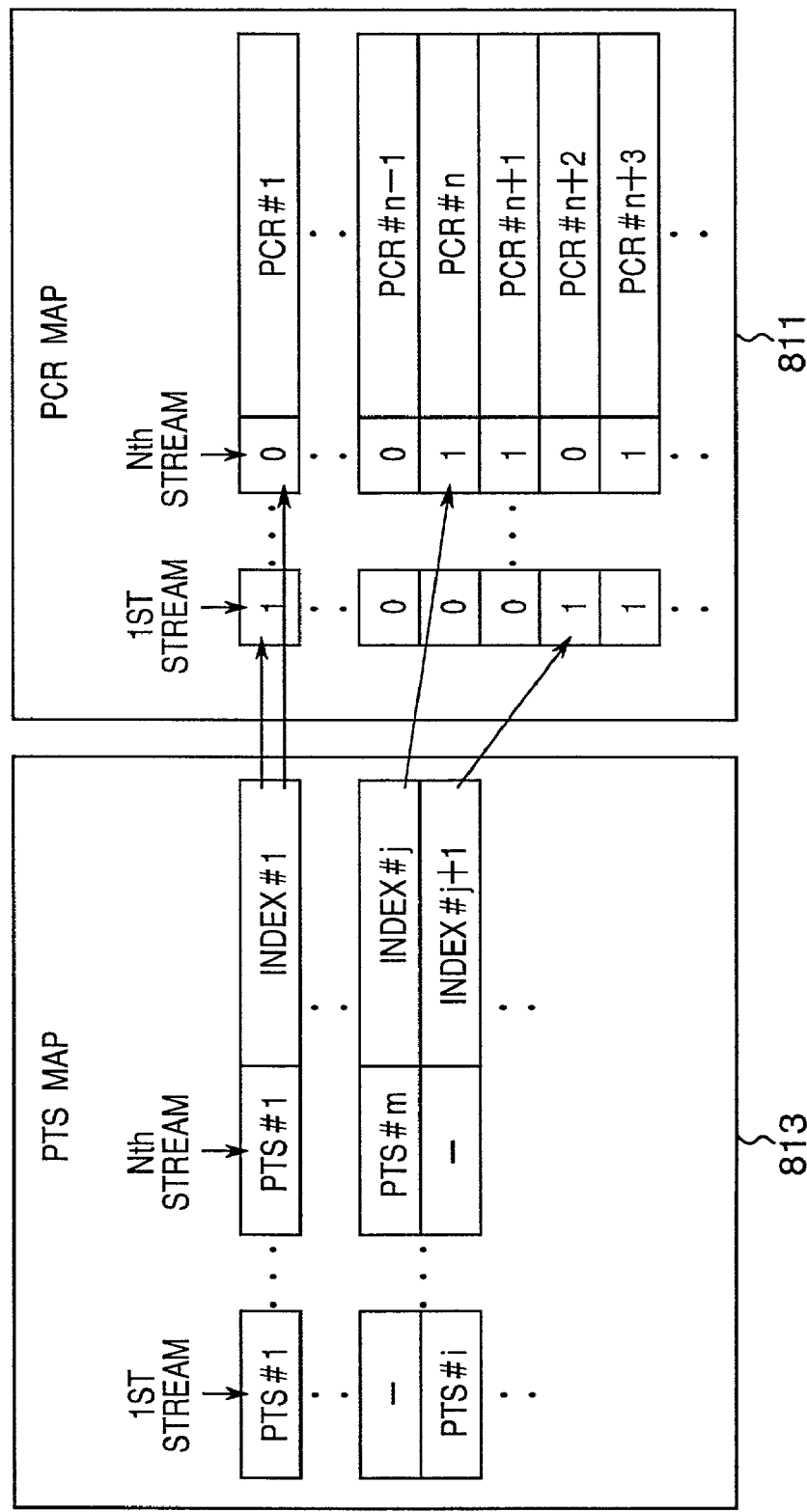
FIG. 26 shows a multi-stream compatible access map.

The application to multistream data is described next with reference to FIG. 26.

Plural video streams can be multiplexed together to an MPEG transport stream. If there are N video streams, then the number of multiplexed video streams (Number_of_Streams) 831 is written to the digital broadcast object general information (D_VOB_GI) as shown in FIG. 26.

In this case, the I-picture Included Flag field of the PCR entries is expanded according to the respective N number of streams in the PCR map 811. In PTS map 813, the PTS field for the I-pictures in the PTS entries is likewise expanded according to the N number of streams.

(Recorder)

The structure and basic operation of the recorder are substantially identical to those described in the first embodiment.

What is important to note in the present embodiment is that analyzer 1906 generates the above-described PCR map and PTS map. If the recorder does not have the ability to generate the PTS map, that is, if it cannot analyze the MPEG stream to detect the video data, all I-picture Included Flags in the PCR entries are cleared to 0, and the I-picture flag validity flags in the D_VOB_GI are also turned off (set to "invalid").

The process whereby analyzer 1906 generates the access map is described in detail below with reference to the flow charts shown in FIGS. 27 and 28.

Figure 27:
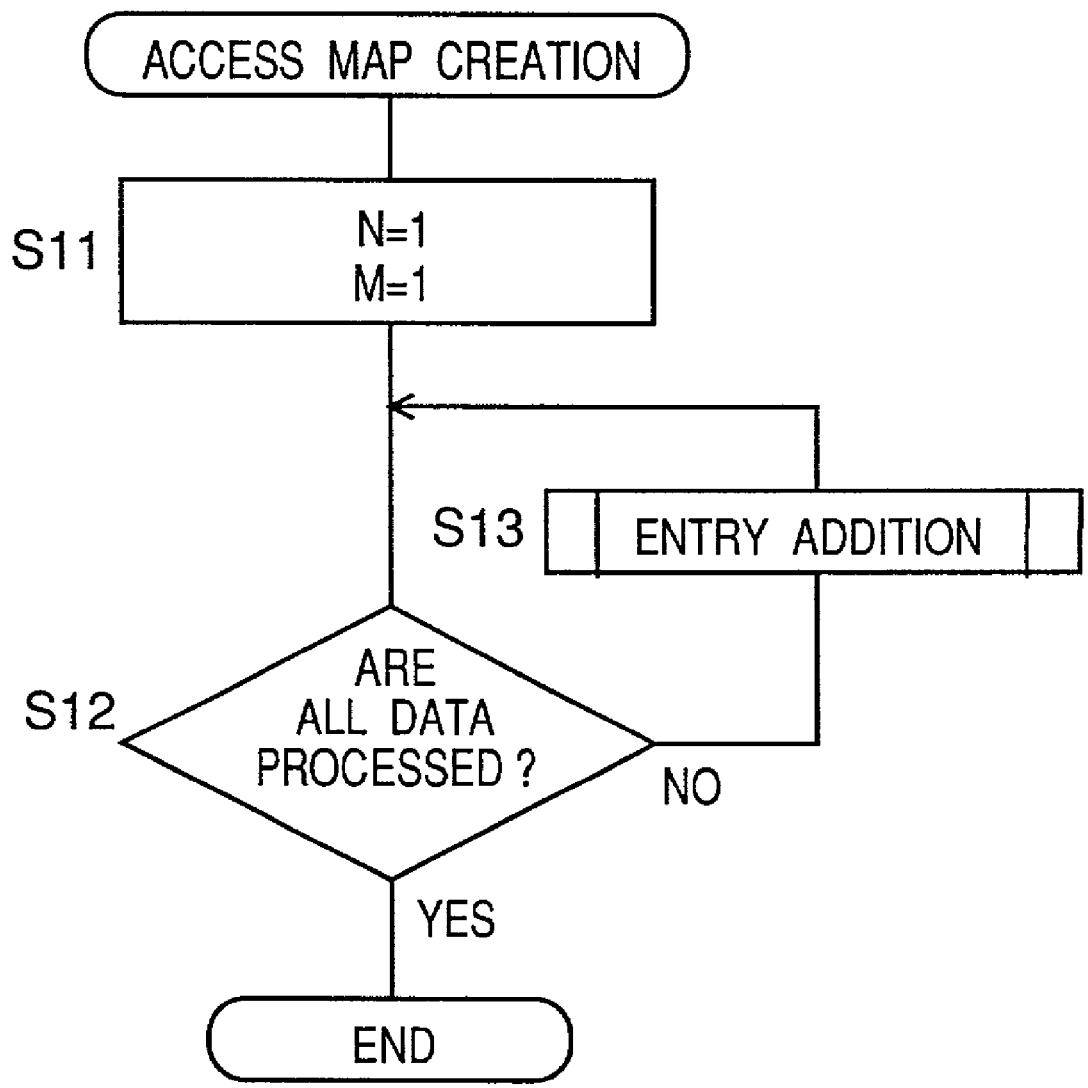
FIG. 27 is a flow chart showing an access map generating process.

As shown in FIG. 27, the first step is to set both counter M which indicates the added entry number to PCR map 811, and counter N which indicates the added entry number to PTS map 813, to 1 (S11). It is determined whether the entry adding process (S13) described below has been completed for the data in all objects specified by the cell information in the PGC (S12), and the entry adding process (S13) is applied to the data for all specified objects.

Figure 28:
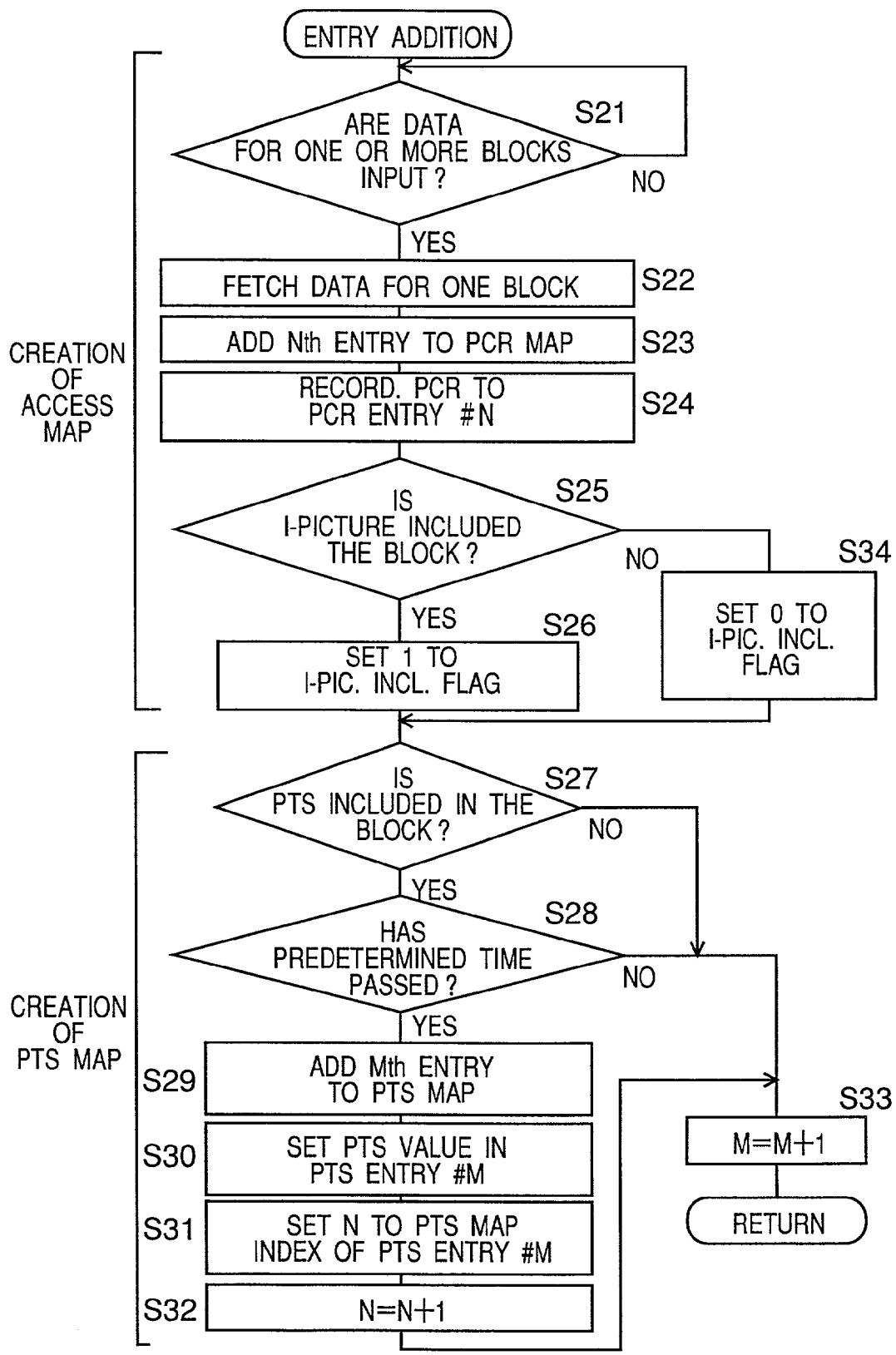
FIG. 28 is a flow chart showing a process for adding an entry to each map of the access map.

FIG. 28 is a flow chart of the entry adding process (S13). When data for one or more blocks is input to the track buffer (S21), data for one block is removed (S22), and Nth entry (entry #N) indicated by the counter N is added to the PCR map (S23).

The PCR value of the leading transport packet contained in the block corresponding to the entry is recorded as the PCR value for PCR entry #N (S24). It is determined whether that block contains an I-picture (S25). If the block contains an I-picture, the I-picture Included Flag of PCR entry #N is set on ("1") (S26), otherwise, the I-picture Included Flag for PCR entry #N is set off ("0") (S34).

Then it is determined whether that block contains a PTS (S27). If not, the process moves to step S33. If the block contains a PTS, it is determined whether a specified amount of time has passed since the previous PTS entry was added (S28). In other words, an entry is not added to PTS map 813 for every block that contains a PTS, but only so that there is one entry for a block including PTS per specified time interval. This limits the size of the PTS map 813.

If step S28 determines that this specified time since the previous PTS entry was added has not elapsed, control passes to step S33. If this specified time has elapsed since the previous PTS entry was added, a new entry is added to the PTS map 813 (S29). More specifically, an M-th entry (entry #M) as indicated by the counter M is added to PTS map 813. The PTS value of the block is stored as the PTS value of PTS entry #M (S30), the value of counter N is stored as the index for PCR map to PTS entry #M (S31), and N is then incremented (S32). Counter M is then incremented in step S33, and this process ends.

(Player)

The structure and basic operation of the player in this embodiment are substantially identical to those described in the first embodiment.

What is important to note is that as described in this embodiment regarding the playback start and end position information in the cell information, the start and end playback blocks is obtained by referencing the PCR map and I-picture Included Flags.

Playback process referencing the access map is described in detail below using the flow charts in FIGS. 29 and 30. Note that system controller 2002 runs this process.

Figure 29:
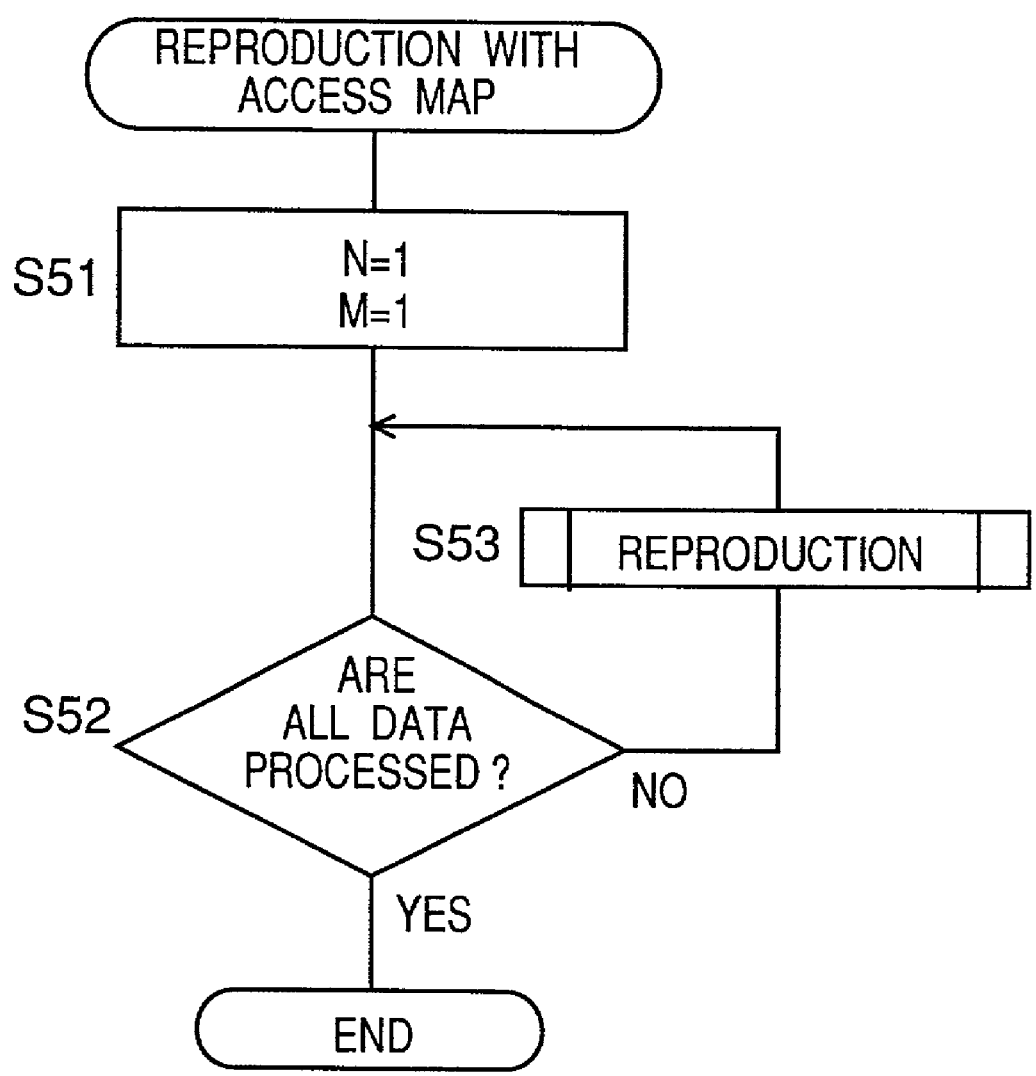
FIG. 29 is a flow chart showing a data playback process referring to the access map.

As shown in FIG. 29, counters M and N are first set to 1 (S51). It is determined whether the playback process (S53) described below has been completed for the data in all objects specified by the cell information in the PGC (S52), and the playback process (S53) is performed for all object data.

Figure 30:
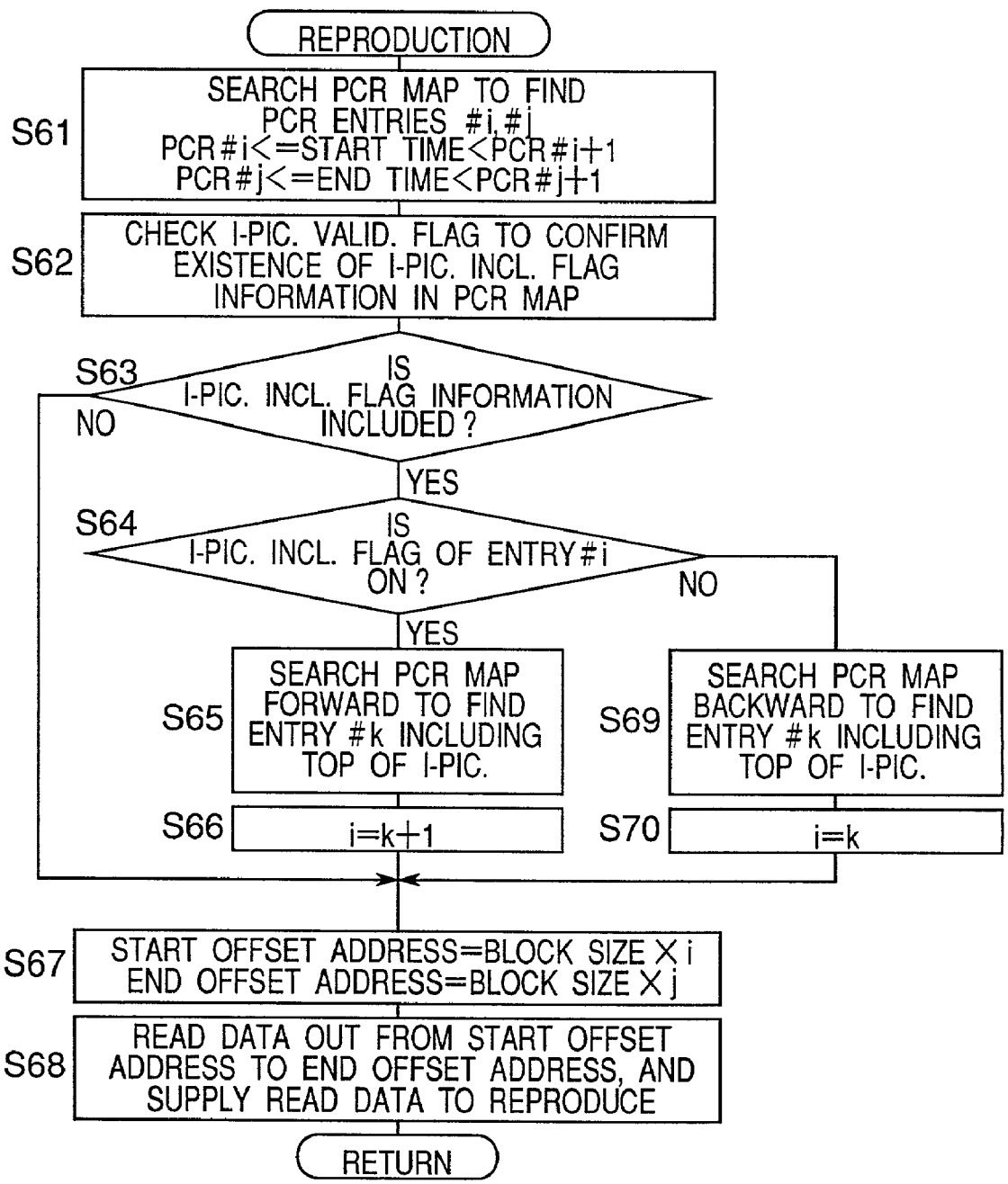
FIG. 30 is a flow chart showing a specific data playback process.

FIG. 30 is a flow chart of this playback process (S53). In this playback process, the specified objects are reproduced from the specified playback start time to the specified playback end time.

The start time (Start) and end time (End) specified in the cell information are first mapped to entries in the PCR map 811. That is, the PCR map 811 is searched to find the PCR entries #i and #j satisfying the following equations from the specified start and end times (S61).

$$PCR\ \#i \leq Start \leq PCR\ \#i+1 \qquad (3)$$

$$PCR\ \#j \leq End \leq PCR\ \#j+1 \qquad (4)$$

The I-picture flag validity flag in the object general information is then checked to determine whether the I-picture Included Flag information is in the PCR map 811 (that is, whether the I-picture Included Flag is valid) (S62). If the I-picture Included Flag information is thus determined to not be present in the PCR map 811 (that is, the I-picture Included Flag information is invalid) (S63), the control steps to step S67.

If the I-picture Included Flag information is present in the PCR map 811 (that is, the I-picture Included Flag information is valid) (S63), it is determined whether the I-picture Included Flag for PCR entry #i is on (S64). When the I-picture Included Flag is on for PCR entry #i, PCR map 811 is searched back (in the temporally earlier direction) from entry #i to find entry #k containing the leading of the I-picture (S65). That is, this search finds the greatest value of k which provides PCR entry #k in which the I-picture Included Flag is off, where k≦i. The value of #i is then set to i=k+1 (S66), and the control steps to step S67.

If the I-picture Included Flag is not on for PCR entry #i (S64), the PCR map is searched downstream (the temporally later direction) from entry #i to find entry #k containing the leading of the I-picture (S69). This search finds the smallest value of k which provides the PCR entry #k where the I-picture Included Flag is on, where k≧i. The value of i is then set to i=k (S70), and the control passes to step S67.

Step S67 then calculates the start offset address and end offset address using the following equations.

$$\text{start offset address} = \text{block size} * i \quad (5)$$

$$\text{end offset address} = \text{block size} * j \quad (6)$$

The data are then read sequentially from the file based on the start offset address and the end offset address to pass to the decoder for playback (S68).

(Variations)

The above embodiments are described using I-pictures in the objects as the access point data when compiling the access map. It is alternatively possible, however, to use the "reference picture" in the MPEG-4 standard, or other independently presentable picture data.

It will also be noted that streams are recorded in ECC block units in the present embodiments, but the same effects can be achieved using other fixed-length block units, and the invention shall not be limited to operating in ECC block units. Furthermore, the block units are described as fixed in the stream, but the block units can alternatively be fixed units on the optical disc.

Yet further, while the PCR values of the transport stream are the values stored to the PCR map in the above embodiments, the system clock reference (SCR) values of the program stream, or the input time to the system decoder, can alternatively be used.

Yet further, while a flag (I-picture Included Flag) is provided in these preferred embodiments to identify whether an I-picture is contained in a particular block, a flag (Reference Picture Included Flag) which consists of plural bits and identifies whether the block contains an I-picture or P-picture can alternatively be used.

In data playback or erase operation, PCR entry #i at which the playback or erasing operation starts is obtained from the start location information in the cell information (CellI) using equation (1), but the value of #i can alternatively approximated using the following equation.

$$\text{PCR } \#i \leq \text{Start} \leq \text{PCR } \#i+1 \quad (7)$$

As also described above, in the playback operation, the I-picture Included Flag of the PCR entry is checked in order to detect the start playback block. If an I-picture is not contained in the block, searching the PCR entry continues in the temporally following direction. It is alternatively possible, however, to detect the I-picture Included Flag in temporally preceding PCR entries to return to the first block of the preceding I-picture.

Furthermore, in the playback operation, it is also described above to check I-picture Included Flag to find the start playback block, to check the temporally preceding PCR entries when an I-picture is present in the block, and then to skip back to the beginning of the I-picture. It is alternatively possible, however, to search forward in the temporally following direction to find the PCR entry for a block containing an I-picture, and then skip forward to the beginning of the next I-picture.

As described above, in the erasing operation, to find the start erase block, the I-picture Included Flags are detected, and If an I-picture is not included then the temporally preceding PCR entry is found to detect the start erase block. It is alternatively possible, however, to find the temporally following PCR entry to detect the start erase block.

As also described above, in the erasing operation, to find the start erase block, the I-picture Included Flags are detected, and If an I-picture is included then the temporally following PCR entry is found to detect the start erase block. It is alternatively possible, however, to find the temporally preceding PCR entry to detect the start erase block.

For playback and erasing operations, the block number "j" of the block where playback or erasing ends is obtained from the end location information of the cell information using equation (2) above, but the following equation can alternatively be used to find the end block in the opposite direction.

$$\text{PCR } \#j \leq \text{End} \leq \text{PCR } \#j+1 \quad (8)$$

Furthermore, during playback operation, when the end playback block determined from the end playback section specified by the user includes an I-picture, the first one of blocks containing the same I-picture can be searched either forward or backward and identified as the end block for playback in the same way as the start block is detected.

It is yet further possible during playback to simply map the start or end block indicated by the user to a PCR entry, and use the location of the mapped block as the start or end playback position without considering the presence of an I-picture (that is, without moving to the block including the beginning of the I-picture).

As also noted above during the erase operation, the start and end erase blocks are determined by detecting the beginning of an I-picture. This operation can be omitted and the start and end positions of the group of blocks to be actually deleted can be determined by simply mapping the start and end blocks of the segment indicated by the user to the respective adjacent blocks.

The PTS map and PCR map are also described as being expanded the same number (N) of fields when there are N multiple streams, but it is also possible to prepare in advance the maps to include a fixed number of M fields (where M≧N), and use only N fields during recording. The value of N is stored to the Number_of_Streams field of the digital broadcast object general information (D_VOB_GI) in this case.

Furthermore, an I-picture Included Flag is set in each PCR entry in the present invention, but it is alternatively possible to set information other than the I-picture Included Flag in each PCR entry. Such possible alternative information include a flag indicating the beginning of an I-picture, a flag indicating the end of an I-picture, or information indicating the size of the I-picture. These information can also be used to identify the block from which playback or erasing operations start.

It will also be noted that while the present invention is described with reference to an optical disc, an optical disc recorder, and an optical disc player, the invention shall not be so limited. It will be obvious that the same effects can be achieved whether the MPEG transport stream is recorded to a hard disk or other type of media, and the invention shall not be limited to physical media.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims.

What is claimed is:

1. An information recording apparatus for recording information to an information recording medium for storing at least two objects containing multiplexed encoded video data and encoded audio data, and management information for managing the at least two objects,
   the video data including intra-coded picture data and inter-coded picture data,
   the at least two objects including at least a first object and a second object,
   the first object being an object for which a location of the intra-coded picture data in the object is managed by the management information,
   the second object being an object for which a location of the intra-coded picture data in the object is not managed by the management information,
   the first object being of a different type than the second object,
   the management information being information for separately managing the first object and the second object, and including map information for each first object, and
   the map information correlating a playback time of the corresponding first object with the location of the intra-coded picture data included in the corresponding first object,
   the apparatus comprising:
   an interface for inputting an object from an external part;
   a generating section for generating management information corresponding to the input object; and
   a recording section for recording the input object and the management information to the information recording medium,
   wherein the generating section includes
      a detection section for determining if a block contained in the input object includes intra-coded picture data, and
      a producing section for producing the management information containing map information based on a result from the detection section,
   wherein the management information has, as information to identify the first object and second object, a validity flag which indicates whether the map information for each first object and second object is valid, and
   wherein the generating section is further for
      determining whether the input object is a first object or a second object,
      generating the management information including the map information for the first object, and setting the validity flag in the management information to a valid state, when the input object is determined to be a first object, and
      generating the management information for the second object, and setting the validity flag in the management information to an invalid state, when the input object is determined to be a second object.

2. A method of recording information to an information recording medium for storing at least two objects containing multiplexed encoded video data and encoded audio data, and management information for managing the at least two objects,
   the video data including intra-coded picture data and inter-coded picture data,
   the at least two objects including at least a first object and a second object,
   the first object being an object for which a location of the intra-coded picture data in the object is managed by the management information,
   the second object being an object for which a location of the intra-coded picture data in the object is not managed by the management information,
   the first object being of a different type than the second object,
   the management information being information for separately managing the first object and the second object, and including map information for each first object, and
   the map information correlating a playback time of the corresponding first object with the location of the intra-coded picture data included in the corresponding first object,
   the recording method comprising:
   inputting the object from an external part;
   generating management information for the input object; and
   recording the input object and the management information to the information recording medium,
   wherein the generating includes
      detecting whether the input object is a first object or a second object, and if the input object is a first object, determining if a block contained in the input object includes the intra-coded picture data, and
      producing the management information containing the map information based on a result of the determining,
   wherein the management information has, as information to identify the first object and the second object, a validity flag which indicates whether the map information for each first object and second object is valid, and
   wherein the generating further includes
      determining whether the input object is a first object or a second object,
      when the input object is determined to be a first object, generating the management information including the map information for the first object, and setting the validity flag of the management information to a valid state, and
      when the input object is determined to be a second object, generating the management information for the second object, and setting the validity flag in the management information to an invalid state.

3. An information recording medium having stored thereon at least two objects containing multiplexed encoded video data and encoded audio data, and management information for managing the at least two objects, the management information being used to reproduce the audio and video data in a reproduction apparatus, wherein
   the video data includes intra-coded picture data and inter-coded picture data,
   the at least two objects include at least a first object and a second object,
   the first object is an object for which a location of intra-coded picture data in the object is managed by the management information,
   the second object is an object for which the location of intra-coded picture data in the object is not managed by the management information,
   the first object is of a different type than the second object,
   the management information is information for separately managing the first object and the second object, and includes map information for each first object,
   the map information correlates a playback time of the corresponding first object with the location of intra-coded picture data included in the corresponding first object, and
   the management information has, as information to identify the first object and second object, a validity flag which indicates whether the map information for each first object and second object is valid.

* * * * *